（12）United States Patent
Goswami et al.

(10) Patent No.: US 8,732,290 B2
(45) Date of Patent: May 20, 2014

(54) VIRTUAL WORKPLACE SOFTWARE BASED ON ORGANIZATION CHARACTERISTICS

(75) Inventors: Kumar Goswami, Sunnyvale, CA (US);
Michael Peercy, Sunnyvale, CA (US);
Matthew Saunders, Wallingford (GB);
Erick Verlangieri, Aventura, FL (US);
Rachana Rele, San Francisco, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 161 days.

(21) Appl. No.: 13/253,370

(22) Filed: Oct. 5, 2011

(65) Prior Publication Data
US 2012/0089666 A1 Apr. 12, 2012

Related U.S. Application Data

(60) Provisional application No. 61/390,118, filed on Oct. 5, 2010.

(51) Int. Cl.
*G06F 15/173* (2006.01)
(52) U.S. Cl.
USPC .............. 709/223; 709/219; 709/227; 718/1
(58) Field of Classification Search
USPC ......... 709/201, 202, 203, 217, 219, 223, 225, 709/227, 229, 250; 718/1
See application file for complete search history.

(56) References Cited

U.S. PATENT DOCUMENTS

| | | | | |
|---|---|---|---|---|
| 6,571,245 | B2 * | 5/2003 | Huang et al. | 1/1 |
| 7,346,689 | B1 * | 3/2008 | Northcutt et al. | 709/227 |
| 7,594,185 | B2 * | 9/2009 | Anderson et al. | 715/778 |
| 7,984,483 | B2 * | 7/2011 | Leitz et al. | 726/2 |
| 2005/0195747 | A1 * | 9/2005 | Stamps et al. | 370/241 |
| 2010/0269135 | A1 * | 10/2010 | Hulse et al. | 725/37 |
| 2012/0239729 | A1 * | 9/2012 | Hefter et al. | 709/203 |

OTHER PUBLICATIONS

"Nebulas Solutions Launches 'VDI in a Box' to Cut the Cost, Time and Complexity of Deploying Virtual Desktop Infrastructures" 2 pages.

* cited by examiner

*Primary Examiner* — Viet Vu
(74) *Attorney, Agent, or Firm* — Banner & Witcoff, Ltd.

(57) ABSTRACT

Virtual workplace server software may be selected for and/or provided to an organization server based on various characteristics of the organization. One or more inputs may be received corresponding to organization characteristics, for example, organization type and size, along with other potential organization characteristics and additional relevant information. Based on the organization characteristics and/or other relevant information, virtual workplace software may be selected for an organization server. The selection of the virtual workplace software may be output and/or the corresponding software may be downloaded and installed to provide desktop virtualization at the organization server. After the virtual workplace software is installed at a desktop virtualization server, the software may be used to provide virtual desktops to authorized end users and management functionality to authorized administrators.

20 Claims, 19 Drawing Sheets

VIRTUAL WORKPLACE SOFTWARE BASED ON ORGANIZATION CHARACTERISTICS

RELATED APPLICATIONS

The present application is a non-provisional of U.S. patent application Ser. No. 61/390,118, entitled "VDI-in-a-box Virtual Desktop System and Method," filed Oct. 5, 2010, the contents of which are incorporated herein by reference in their entirety for all purposes.

BACKGROUND

Traditionally, personal computers have been implemented as hard-coded combinations of operating systems, applications, and user settings, which are managed individually by owners or administrators on an ongoing basis. However, many organizations are now using desktop virtualization to provide a more flexible option to address the varying needs of their users. In desktop virtualization, a user's computing environment (e.g., operating system, applications, and/or user settings) may be separated from the user's physical computing device (e.g., smartphone, laptop, desktop computer). Thus, using client-server technology, a "virtualized desktop" may be stored in a remote central server, rather than in the local storage of the client computing device.

There are several different types of desktop virtualization systems. As an example, Virtual Desktop Infrastructure (VDI) refers to the process of running a user desktop inside a virtual machine that resides on a server. VDI and other server-based desktop virtualization systems may provide personalized desktops for each user, while allowing for centralized management and security. Servers in such systems may include storage for virtual desktop images and system configuration information, as well as software components to provide the virtual desktops and allow users to interconnect to them. For example, a VDI server may include one or more hypervisors to create and maintain multiple virtual machines, software to manage the hypervisor(s), a connection broker, and software to provision and manage the virtual desktops.

SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

According to certain aspects, one or more virtual workplace software components may be selected and/or provided to an organization server based on certain characteristics of the organization. For example, one or more inputs may be received via a user interface or other means corresponding to organization characteristics such as organization type and/or size, along with other possible organization characteristics. Additional input may be received corresponding to one or more characteristics of a requested virtual workplace environment to be provided at an organization server. Based on certain organization characteristics and/or other relevant information, one or more virtual workplace software components may be selected for an organization server. The selection of the virtual workplace software may be output, and, in certain embodiments, may be downloaded and/or installed at the organization server to provide desktop virtualization for the organization's users.

According to other aspects, virtual workplace software at a desktop virtualization server may be used to provide virtual desktops to end users and/or management functionality to administrators. For example, certain virtual workplace software may be used to provide a login user interface and authenticate users at the desktop virtualization server. The virtual workplace software may, in some embodiments, identify a user as an authorized end user and provide the user with access to a virtual machine corresponding to the user's identity and virtual machine template associations. In some embodiments, the virtual workplace software may identify a user as an authorized administrator and may provide the administrator with access to one or more desktop virtualization server management functions.

BRIEF DESCRIPTION OF THE DRAWINGS

Figure 1:
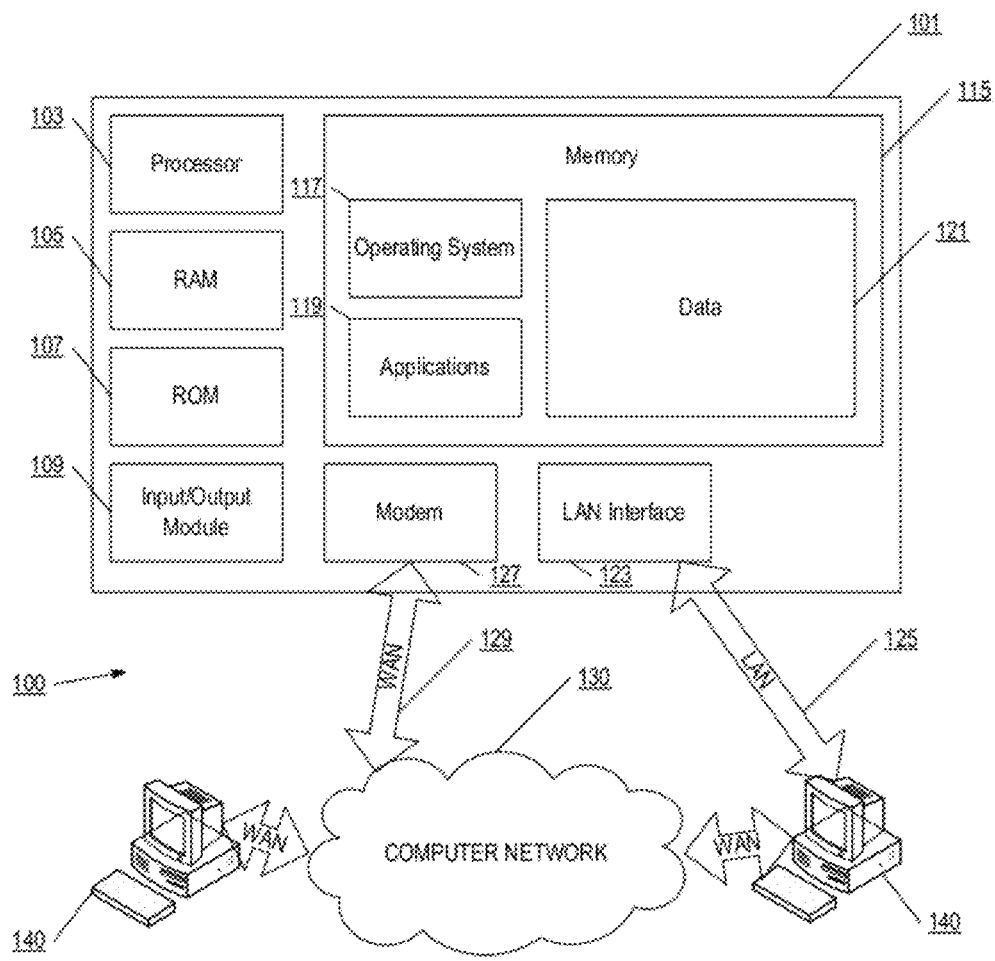

Having thus described aspects of the disclosure in general terms, reference will now be made to the accompanying drawings, which are not necessarily drawn to scale, and wherein:

FIG. 1 illustrates an example operating environment in which various aspects of the disclosure may be implemented.

Figure 2:
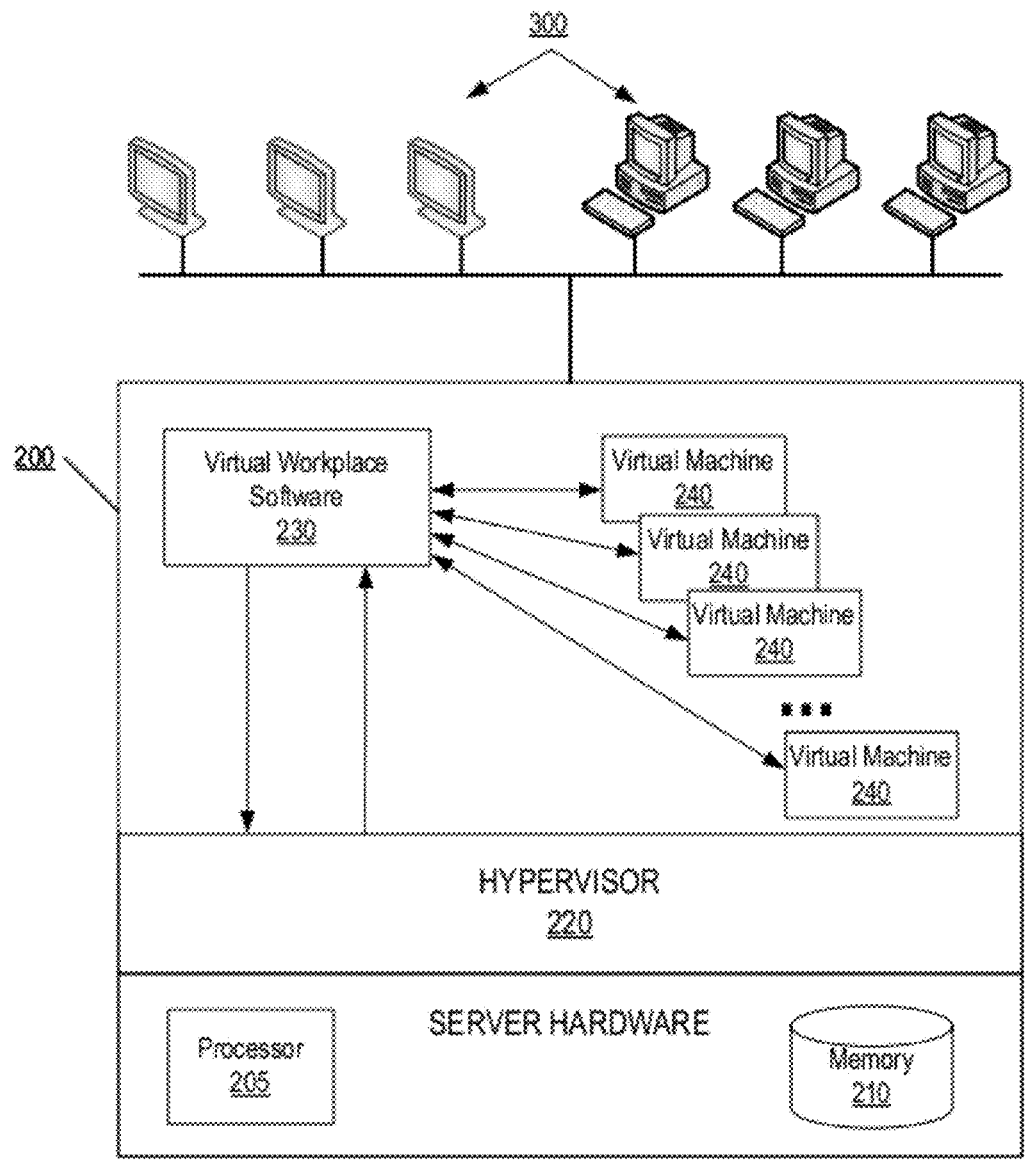

FIG. 2 is a high-level architecture diagram of a desktop virtualization system in accordance with one or more illustrative aspects described herein.

Figure 3:
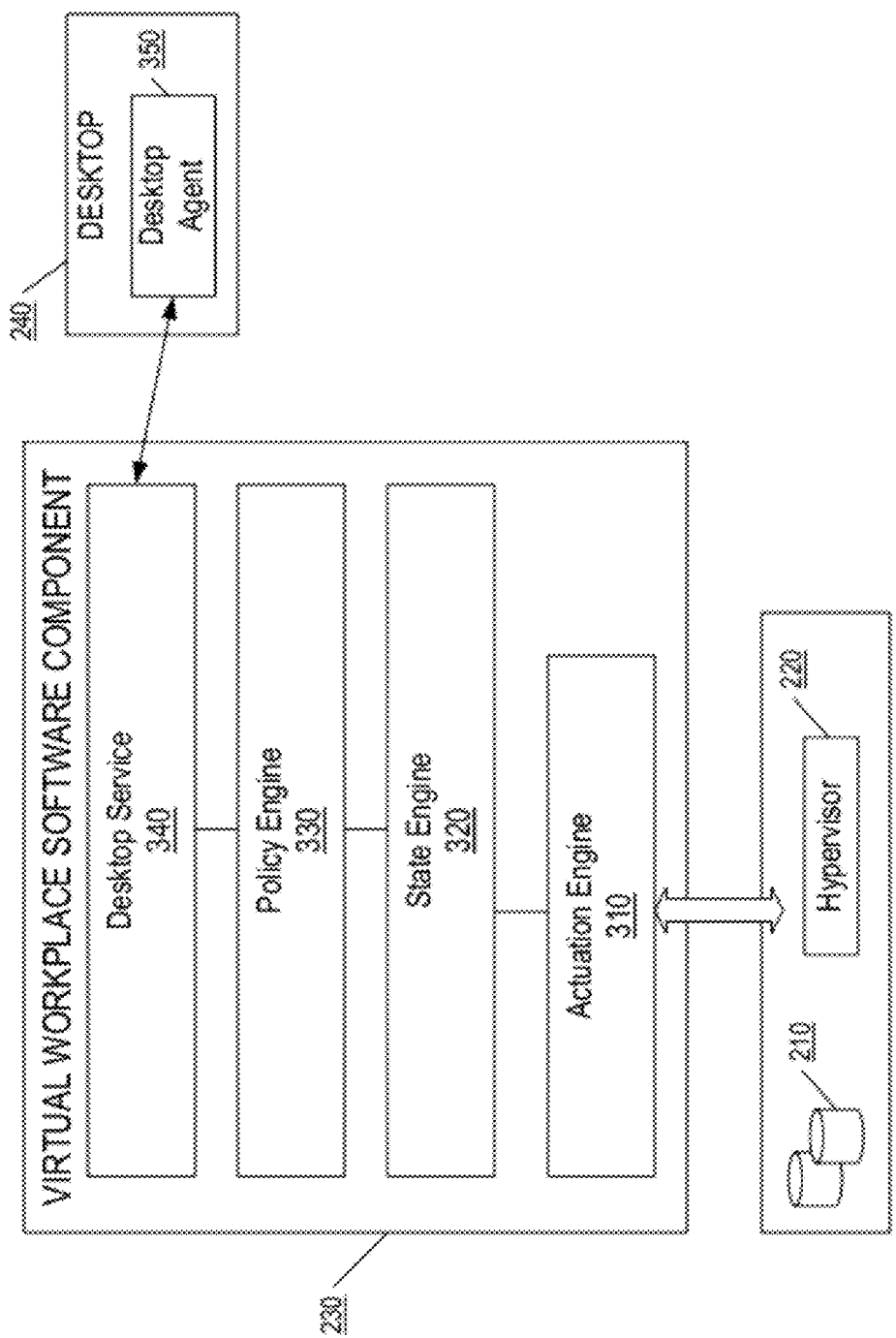

FIG. 3 is a functional component diagram illustrating a desktop virtualization system in accordance with one or more illustrative aspects described herein.

Figure 4:
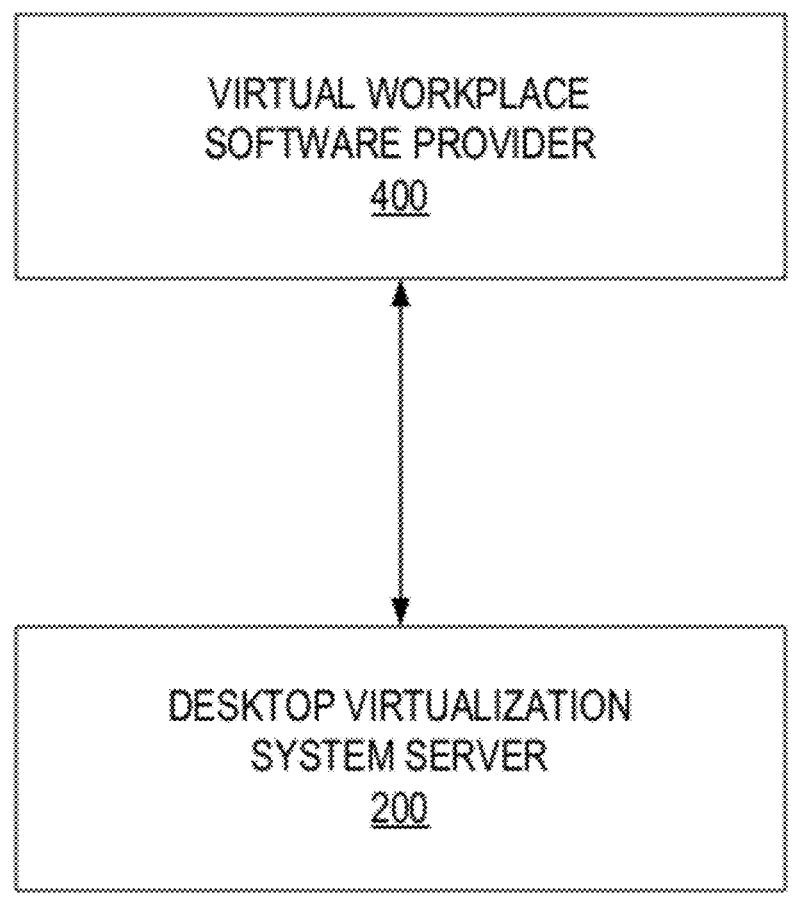

FIG. 4 is a component diagram of a system of selecting and providing desktop virtualization software to a desktop virtualization system server in accordance with one or more illustrative aspects described herein.

Figure 5:
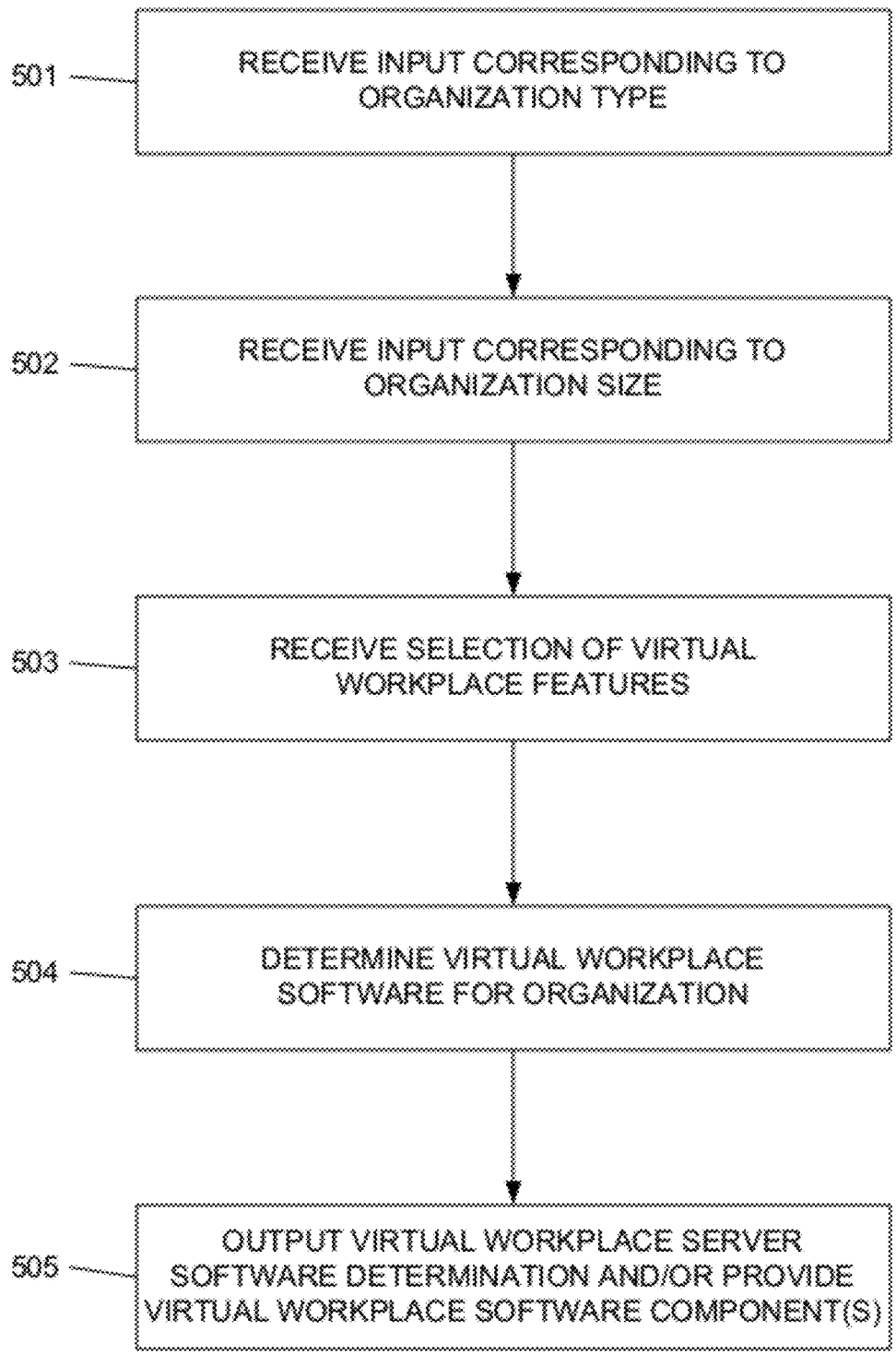

FIG. 5 is a flow diagram illustrating a method of selecting and providing virtual workplace software in accordance with one or more illustrative aspects described herein.

FIGS. 6-11 illustrate example user interface screens for selecting and providing virtual workplace software in accordance with one or more illustrative aspects described herein.

Figure 12:
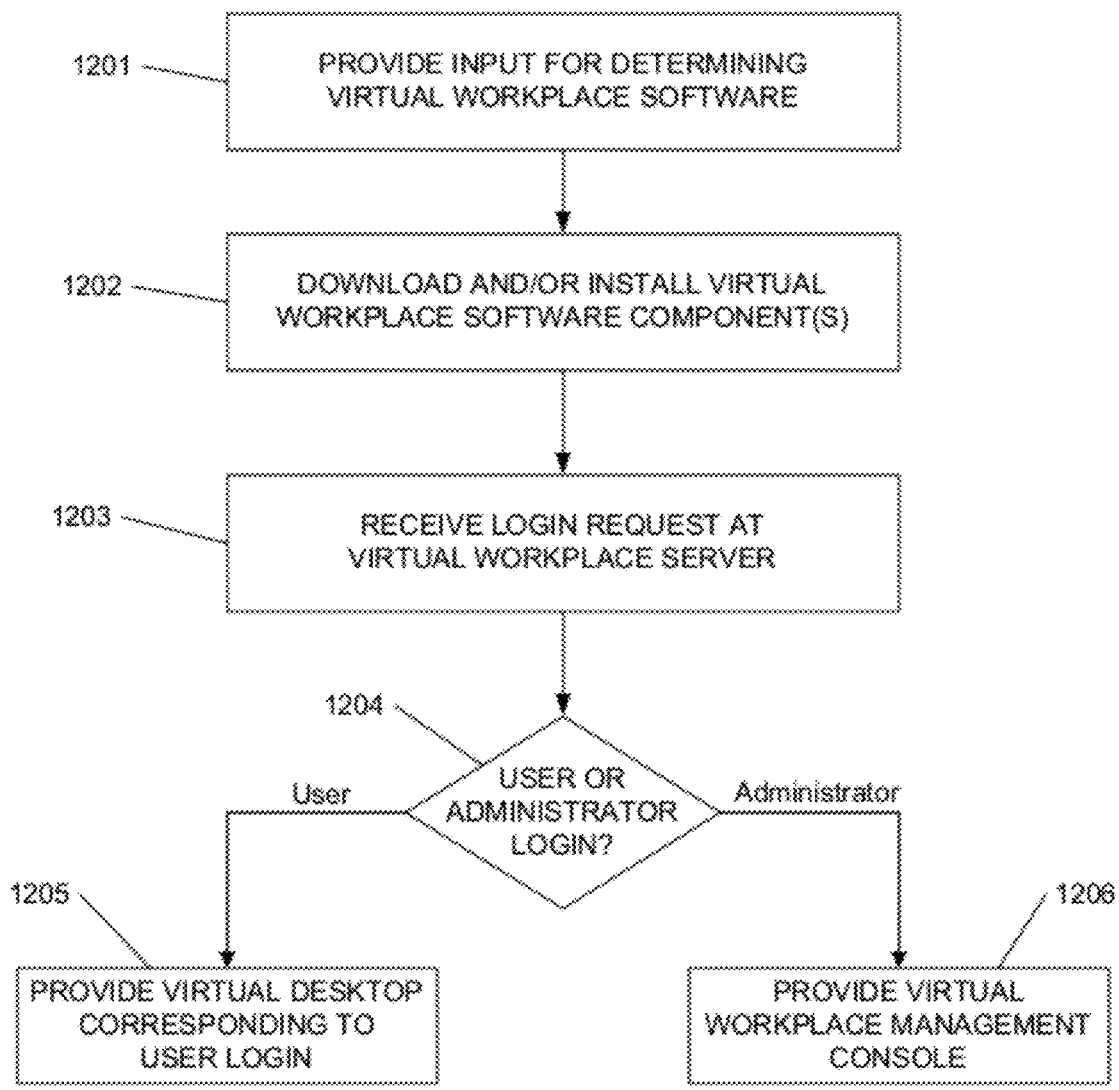

FIG. 12 is a flow diagram illustrating a method of providing a virtual desktop and/or providing a virtual workplace management console by a desktop virtualization system in accordance with one or more illustrative aspects described herein.

FIGS. 13-19 illustrate example user interface screens for using virtual workplace software in accordance with one or more illustrative aspects described herein.

DETAILED DESCRIPTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope and spirit of the present invention.

As will be appreciated by one of skill in the art upon reading the following disclosure, various aspects described herein may be embodied as a method, a data processing system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

FIG. 1 illustrates an example block diagram of a generic computing device 101 (e.g., a computer server) in an example computing environment 100 that may be used according to one or more illustrative embodiments of the disclosure. According to one or more aspects, generic computing device 101 may be a server in a desktop virtualization system configured to provide virtual machines for client access devices. The generic computing device 101 may have a processor 103 for controlling overall operation of the server and its associated components, including random access memory (RAM) 105, read-only memory (ROM) 107, input/output (I/O) module 109, and memory 115.

I/O module 109 may include a mouse, keypad, touch screen, scanner, optical reader, and/or stylus (or other input device(s)) through which a user of generic computing device 101 may provide input, and may also include one or more of a speaker for providing audio output and a video display device for providing textual, audiovisual, and/or graphical output. Software may be stored within memory 115 and/or other storage to provide instructions to processor 103 for enabling generic computing device 101 to perform various functions. For example, memory 115 may store software used by the generic computing device 101, such as an operating system 117, application programs 119, and an associated database 121. Alternatively, some or all of the computer executable instructions for generic computing device 101 may be embodied in hardware or firmware (not shown).

The generic computing device 101 may operate in a networked environment supporting connections to one or more remote computers, such as terminals 140. The terminals 140 may be personal computers or servers that include many or all of the elements described above with respect to the generic computing device 101. The network connections depicted in FIG. 1 include a local area network (LAN) 125 and a wide area network (WAN) 129, but may also include other networks. When used in a LAN networking environment, the generic computing device 101 may be connected to the LAN 125 through a network interface or adapter 123. When used in a WAN networking environment, the generic computing device 101 may include a modem 127 or other network interface for establishing communications over the WAN 129, such as computer network 130 (e.g., the Internet). It will be appreciated that the network connections shown are illustrative and other means of establishing a communications link between the computers may be used.

Generic computing device 101 and/or terminals 140 may also be mobile terminals (e.g., mobile phones, smartphones, PDAs, notebooks, etc.) including various other components, such as a battery, speaker, and antennas (not shown).

The disclosure is operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Referring to FIG. 2, a diagram is shown illustrating a high-level architecture of an illustrative desktop virtualization system. In this example, the desktop virtualization system includes a server 200 (e.g., a VDI server) configured to provide virtual desktops to one or more client access devices 300. The server 200 includes a processor 205 and memory 210, and also may include one or more of the features of the general computing device 101 discussed above.

In this example, the server 200 includes a hypervisor 220 capable of creating and managing virtual machines 240 on the server 200. The hypervisor 220 is a software layer that may execute directly on the hardware of the server 200, or may execute within the operating system of the server 200. Although only one hypervisor 220 is shown in this example, servers in desktop virtualization systems may include multiple different hypervisors 220, each supporting its own set of virtual machines 240.

The server 200 in this example also includes virtual workplace software 230. The virtual workplace software 230 may include one or more software components having the functionality to control the hypervisor 220, create and manage virtual machines 240, and to enable authorized access to the virtual machines 240 by end users at client access devices 300. As shown in this example, the virtual workplace software 230 may execute on the hypervisor 220 within server 200. For example, the virtual workplace software 230 may run as a virtual machine on the hypervisor 220 that it manages. In other examples, virtual workplace software 230 may execute as an application on a separate machine different from the server 200, and may communicate with the hypervisor 220 via a network protocol.

Each virtual machine 240 created and/or managed by the virtual workplace software 230 may support one or more virtual desktops for users at client devices 300. As described in more detail below, clients 300 may connect to a virtual machine 240 over a network (e.g., the Internet 130) to initiate a virtual desktop for a user at the client device 300 (e.g., thin client, laptop, or mobile device, etc.). For example, users may use web browser software to access a web-based console provided by the virtual workplace software 230. In other examples, a graphical user interference client application may be installed on the client devices 300 which is designed to connect to and communicate with the virtual workplace software 230. When a user at client device 300 attempts to access the virtual workplace software 230 to initiate a virtual desktop session, or to perform any of the management or administrative functions of the desktop virtualization system, the virtual workplace software 230 may authenticate the user to confirm that the user has the proper authority to perform the functions requested by the user. After the user has been authenticated, the virtual workplace software 230 may select a virtual machine 240 for the user's virtual desktop session and provide the user with the Internet Protocol (IP) address of the selected virtual machine 240 and/or may connect the user's access device 300 to the remote desktop protocol client running on the virtual machine 240.

As described below in more detail, the virtual workplace software 230 also may provide a graphical user interface through which administrators can manage the desktop virtualization system and/or an application programming interface (API) that may be accessed by other programs to perform management functions for the desktop virtualization system.

The virtual workplace software 230 may control the hypervisor 220 to create the virtual machines 240 running the virtual desktops for clients 300. Each virtual machine 240 may be created from a template that identifies one or more virtual machine characteristics, for example, the operating system the virtual machine 240 will run, a set of applications the virtual machine 240 will contain, amounts of the CPU and RAM resources of the server 200 that the virtual machine 240 is permitted to consume, and other such characteristics that may be required to create and run virtual machines 240. As described below, authorized administrators may create different types of virtual machine templates via the virtual workplace software 230. Administrators also may specify valid and/or invalid users, and assign users and groups of users to different templates using the virtual workplace software 230.

Referring now to FIG. 3, a functional component diagram is shown for an example virtual workplace software component 230. In this example, the virtual workplace software 230 may be one or more software components configured to provide out-of-the-box support for desktop virtualization systems. Thus, the virtual workplace software component(s) 230 may perform a wide variety of desktop virtualization functions, for example, managing the hypervisor, creating and destroying virtual machines, and setting-up connections between the virtual machines and users.

In this example, the virtual workplace software 230 includes an actualization engine 310 configured to communicate with the hypervisor 220 and memory/storage system 210 of the server 200. The actualization engine 310 may use an API published by the hypervisor to create, start, clone, modify, shutdown, and delete virtual machines 240. The actualization engine 310 may also provide the media access control (MAC) addresses, virtual networks, storage and other resources required by the virtual machines 240. Additionally, the actualization engine 310 may provide one or more APIs, which may be used by the state engine 320 or other components, to allow these components to manage the data storage of the desktop virtualization system (e.g., request and modify various storage sizes, remaining capacities, etc.), and to write and retrieve data from the storage system 210. Through these APIs and/or additional programming techniques, the actualization engine 310 may provide a layer of abstraction to the hypervisor 220, allowing the virtual workplace software 230 to run successfully on different types of hypervisors 220.

The virtual workplace software 230 in this example includes a state engine 320. The state engine 320 may store a comprehensive view of the state of the desktop virtualization on the server 200, for example, data corresponding to all virtual machines 240 and their states, lists of virtual machine templates along with their associated users and groups, and policy and configuration information required to manage the templates, users, and virtual desktops. The state engine may also maintain current virtual desktop session information such as a list of the users/clients 300 that are currently logged in, the virtual machines 240 the each user is logged into, how long each user has been logged in, and other state information needed to manage user sessions and to recover from session failures. The data maintained by the state engine 320 may persist across a reboot of the virtual workplace software 230 and/or server 200, and the state engine may use an API provided by the actuator 310 to persist its state information to the storage system 210.

A policy engine 330 also may be included in the virtual workplace software 230. The policy engine (or director) component 330, may include the software logic for orchestrating multi-step activities or asynchronous activities performed by the desktop virtualization system. For example, the policy engine 330 may coordinate and control the creating and/or deleting of multiple virtual machines 240. The policy engine 330 also may control creation, deletion, and re-generation of virtual machines 240 from their virtual machine templates.

In this example, the virtual workplace software 230 includes a desktop service 340 configured to communicate with a desktop agent software component 350 running on each virtual machine 240. The desktop service 340 may send/receive messages from each of its associated desktop agents 350, and then leverage the policy engine 330, state engine 320, and actuation engine 310 to manage virtual machines 240, virtual machine templates, and user associations, etc. The desktop service 340 may also provide a connection broker that accepts login credentials from users at client devices 300 (e.g., via a web server or other client-server configuration), and then creates and/or assigns virtual machines 240 to authorized users, and provides management consoles to authorized administrators.

A desktop agent software component 350, which may execute on some or all of the virtual machines 240 in the virtualization system, may monitor the health and status of its virtual machine 240 and provide the relevant information to the virtual workplace software 230. For example, each desktop agent 350 may send a periodic message to the desktop service 340 to confirm that the virtual machine 240 is still operating. The desktop agent 350 also may send a message to the desktop service 340 whenever a user logs in or out of its virtual machine 240, including the name of the user.

Having described an example high-level architecture of a desktop virtualization system in FIG. 1, and having described certain functionality of such virtualization systems in FIG. 2, the following paragraphs provide additional examples of various methods and systems relating to desktop virtualization. In FIGS. 4-11, methods and systems are described for providing virtual workplace software to a desktop virtualization server based on selected organization characteristics and other information. In FIGS. 12-19, methods and systems are described for using the virtual workplace software at a desktop virtualization server to create and provide virtual machines 240 to end users and/or to provide virtual workplace management consoles to authorized administrators.

Referring now to FIG. 4, a component diagram of a system for selecting and providing desktop virtualization software (e.g., virtual workplace software 230) to a computer server 200 (e.g., desktop virtualization system server 200) is shown. In this example, the desktop virtualization system server 200 may correspond to the desktop virtualization server 200 described above in reference to FIGS. 2-3, and the virtual workplace software provider 400 may be a computer server including many or all of the elements described above relative to the general computing device 101 (e.g., a processor, memory, etc.). The software provider 400 and desktop virtualization server 200 may be connected via one or more computer networks, including a LAN (e.g., an organizational Intranet), a WAN (e.g., the Internet), and/or other networks.

The software provider 400 and desktop virtualization server 200 in this example may be operated in a client-server configuration, for example, communicating via a web-based client-server application in which the software provider 400 includes a web server allowing the desktop virtualization server 200 to access web pages and download software from the software provider 400 via a web browser application. In other examples, the desktop virtualization server 200 may execute a standalone client software application configured to access a non-web based service or other application on the software provider 400 in order to download and/or install the virtual workplace software.

Referring now to FIG. 5, a flow diagram is shown illustrating a method of selecting and providing virtual workplace software to a desktop virtualization system server. The embodiments described in reference to the flow diagram in FIG. 5, and the example user interface screens in FIGS. 6-11, may be implemented by software executed by the client-server system in FIG. 4, or by one or more computer devices including some or all of the features of the general computing device 101 discussed above.

As described below in the steps of FIG. 5, the desktop virtualization server 200 may request and receive virtual workplace software (e.g., VDI server software or virtual workplace software 230, including one or more of hypervisor management software, a connection broker, virtual machine management software, etc.) from a software provider server 400. Thus, although the desktop virtualization server 200 operates as a server with respect to the client access devices 300, the server 200 may first operate as a client with respect to selecting, downloading, installing, and configuring its virtual workplace software 230.

In step 501, a virtual workplace software provider 400 may receive input corresponding to an organization type for an organization that uses or may potentially use desktop virtualization. For instance, an organization may desire to install (or re-install, upgrade, etc.) virtual workplace software 230 onto one or more of its computer servers 200 to provide desktop virtualization services the organization's users. As described below in step 504, certain versions, features, and/or configurations of the virtual workplace software 230 may provide advantages for some organizations (e.g., with respect to cost, security, scalability, reliability, performance, etc.), while different versions, features, and/or configurations of the virtual workplace software 230 may provide potential advantages to other organizations. Thus, the input in step 501 corresponding to the organization type may be used by the software provider 400 to help select a virtual workplace software component 230 for the organization's desktop virtualization server 200.

The organization input in step 501 may be received by the software provider 400 via a user interface, for example, in a web-based or standalone client-server application. In other examples, the organization input may be received using other electronic means (e.g., mobile device application, email, SMS, etc.) The input in step 501 may be received from the organization server 200 on which the virtual workplace software 230 may be installed. Alternatively, the organization input may be received from another source, for example, from a separate computer of a manager or IT professional performing research and comparing potential virtual workplace software implementations.

A user interface provided by the software provider 400 or other source to receive the organization input may include a selectable list of organization types, for example, a healthcare institution organization type (e.g., hospital, clinic, etc.), an educational institution organization type (e.g., school, university, etc.), a financial institution organization type (e.g., bank, credit union, insurance company, etc.); and a governmental institution organization type (e.g., federal, state, or local government office, etc.). In certain examples, a user interface may provide a set of relevant organizational factors or priorities that may be selected instead of, or in addition to, specific organization types. For example, the input in step 501 may consist of user selections or rankings of one or more of the following organization priorities: cost, security, scalability, reliability, and performance. Thus, the organization type need not correspond to the types of products and services provided by the organization (e.g., bank, hospital, school, etc.). Rather, as in this example, the organization type may be stored and expressed as a set of one or more organization factors or priorities (e.g., low cost and scalable, high security and high performance, etc.).

In step 502, the virtual workplace software provider 400 may receive input corresponding to an organization type for the organization that uses or may potentially use the virtual workplace software 230. As in step 501, the organization size input may be received in step 502 via a user interface (e.g., web page, client-server application, etc.) or other electronic means from the organization server 200 or from another source. The organization size input may be number or estimate of the organization size (e.g., 50 people, 500 people, 5,000 people) or may correspond to a subset of the organization that will have access to the virtual workplace software 230 on the server 200. For example, if a large company of 10,000 employees plans to provide a desktop virtualization system intended only for a smaller group of 500 remote workers and contractors, then the user providing the organization size input may enter "500" or select an appropriate size range corresponding to that number, rather than entering the entire organization size. Size may also be defined in other ways including by a number of servers or client devices that are used or will be used, an amount of revenue, a number of offices and the like.

In step 503, the virtual workplace software provider 400 may receive input corresponding to a set of features and/or characteristics for a virtual workplace environment that the organization uses or may potentially use. As in steps 501 and 502, the set of virtual workplace features/characteristics may be received in step 503 via a user interface (e.g., web page, client-server application, etc.) or other electronic means from the organization server 200 or from another source. The virtual workplace features received in step 503 may include many different types of data relating to various aspects of desktop virtualization systems that potentially may be used by the organization. The software provider 400 may provide a robust user interface for managers, administrators, IT professionals, and others who may wish to research and compare different combinations of features and configuration settings for virtual workplace software implementations.

The set of features/characteristics for potential virtual workplace environments that may be specified includes, for example, the type of desktop virtualization to be used in the virtual workplace environment (e.g., VDI and blade PCs, other server-based or client-side virtual desktop models, etc.) and the number of desktop virtualizations servers 200 to be used in the virtual workplace environment (e.g., single server or multi-server installation). The virtual workplace features/characteristics also may specify the minimum/maximum number and type of the virtual machines 240 to be used in the virtual workplace environment. For example, min/max numbers of virtual machines 240 may be selected for one or more pre-defined or currently existing virtual machine templates. As described above, virtual machine templates may define the characteristics of the virtual machines 240 from which they are created, including the operating system of the virtual machine 240, set of applications that will be provisioned on the virtual machine 240, and/or various user and administrative settings for the virtual machine. In other examples, a user may specify an operating system, settings, and/or applications separately without using virtual machine templates. Virtual machine names, descriptions, and other virtual machine properties may also be specified in step 503. Additionally, in step 503, users and/or groups may be defined and associated with virtual machine templates or specific virtual machines.

In certain embodiments, the software provider 400 may recommend a set of features/characteristics for the organization server 200 based on the selection of the organization type in step 501 and/or the selection of the organization size in step 502. For example, based on a specified organization type and size, the software provider 400 may recommend a single-server installation VDI providing a certain number of virtual desktops for members of the organization. In such examples, the software provider 400 may customize the user interface in step 503 to reflect the recommendation (e.g., by ranking or preselecting the corresponding features/characteristics).

In step 504, the virtual workplace software provider 400 may determine the virtual workplace server software 230 for the organization based on the inputs received in steps 501-503. Step 504 may include selecting one or more software components for a single organization server 200 or for multiple organization servers. For instance, if a user specifies a multi-server installation in steps 501 or 503, then the software provider 400 may identify separate and different virtual workplace software 230 to be installed on each of the organization's servers 200. Additionally, as discussed above, the virtual workplace software 230 for each server 200 may include a single downloadable software component 230 or a combination of components.

After analyzing the relevant information received in steps 501-503, the software provider 400 may perform the determination in step 504 by selecting one or more virtual workplace software components 230 from a set of available software components based on the inputs and characteristics of the organization. For example, if the organization is an educational institution, then the software provider 400 may select virtual workplace software 230 that is equipped or preferred for educational institution usage. For instance, the selected virtual workplace software 230 for an educational institution may be lightweight, lower cost, and highly scalable. In another example, if the organization is a governmental institution, then the selected virtual workplace software 230 may be highly secure, highly resilient, and highly scalable. If the organization is a financial institution, then the selected virtual workplace software 230 may be high performance, highly secure, and flexible. If the organization is a healthcare institution, then the selected virtual workplace software 230 may be cost effective and moderately secure.

Additionally, although the software provider 400 in this example may analyze all inputs and relevant information received in steps 501-503, in other examples the determination may be based on a smaller subset of factors or even a single factor. For instance, the virtual workplace software 230 may be selected based on organization type alone (step 501), without regard to organization size (step 502) or any specified software features/characteristics (step 503). Similarly, the virtual workplace software 230 may be selected based solely on organization size, or based solely on one or more specified software features/characteristics, without regard for other factors or information received. In a particular example, the various factors may be weighted according to importance or relevance. Accordingly, each of steps 501, 502, and 503 may be optional in certain embodiments.

In step 505, the selection of the virtual workplace software 230 may be output and/or the corresponding software may be provided to the organization. For example, the software provider 400 may output a description of the selected virtual workplace software 230 via a user interface. The description may include the selected software component(s) for one or more organization servers 200, along with additional information such as configuration settings for the software 230, cost estimates for the software 230, and other relevant data to allow users to review and compare potential virtual workplace software 230 implementations.

In certain embodiments, software provider 400 may provide the capabilities for users of the organization to review and/or modify the selected virtual workplace software 230 and configuration settings, and then directly purchase the software 230 via the user interface. After it is purchased, the virtual workplace software 230 may be provided to the organization either directly or indirectly. For example, if a manager at a central office selects and purchases one or more virtual workplace software components 230 for an organization, the manager may request that the software components 230 be shipped to one or more various locations for installation by the organization personnel at those locations. In other examples, a manager, IT professional, or other user, may select and purchase virtual workplace software 230 directly from the organization server 200 on which the software 230 is to be installed. In these examples, the software provider 400 may allow the user to directly download and install the software 230 via the user interface.

Referring now to FIGS. 6-11, a series of example user interface screens are shown in which virtual workplace software 230 may be selected and/or provided to an organization to be deployed in a virtual workplace environment. As discussed above, the user interface screens in these examples may be provided by a software provider 400, for example, in a web-based application accessible using a web browser, or other client-server application.

Figure 6:
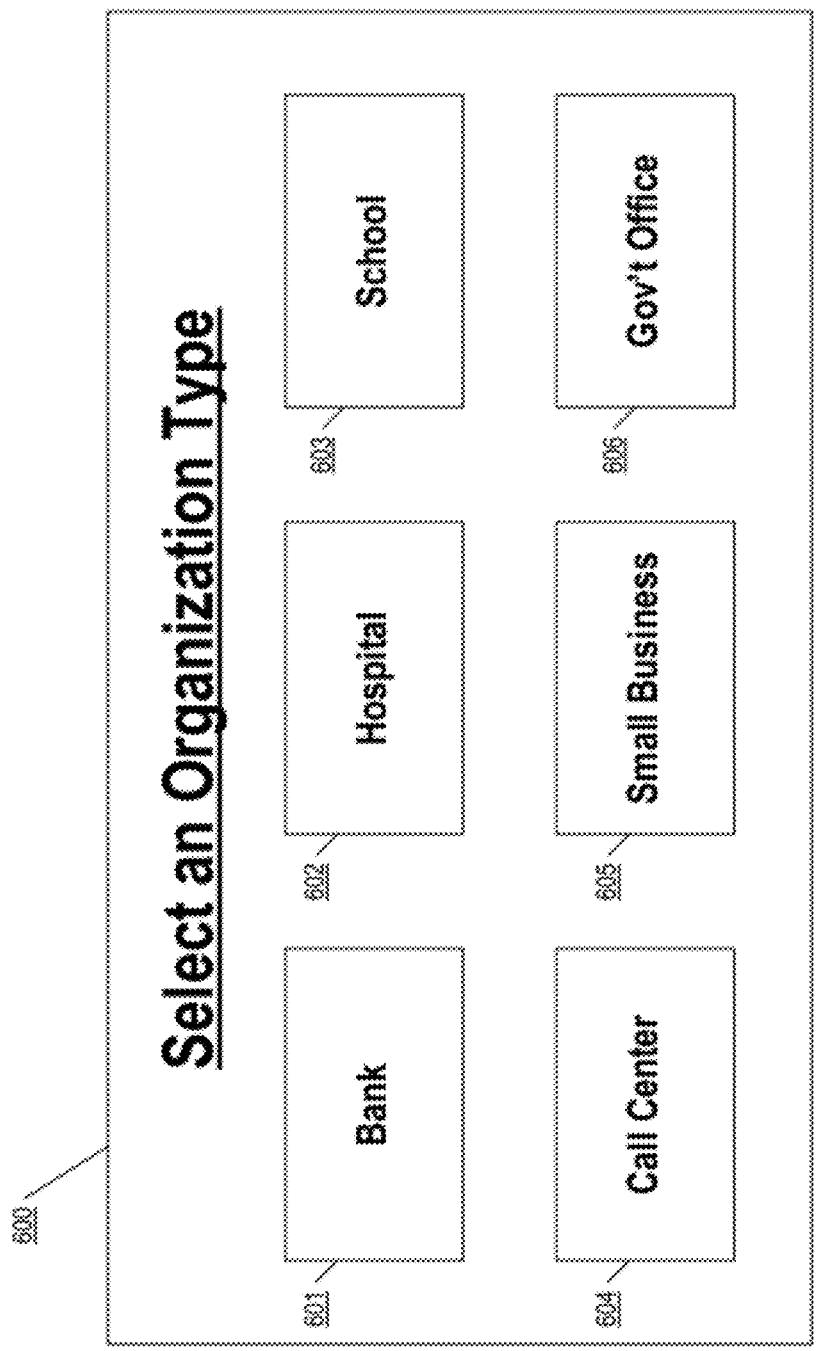

In FIG. 6, the user interface 600 prompts a user to select an organization type from a predetermined set of organization types 601-606. As described above, the organization types 601-606 in this example are merely illustrative, and different organization types may be provided in different examples. In certain embodiments, the user interface 600 may provide user interface components for selecting relevant organizational priorities, factors, or limitations (e.g., a price range, security requirements, scalability requirements, performance requirements, etc.), instead of, or in addition to, the product-based organization types shown in FIG. 6.

Figure 7:
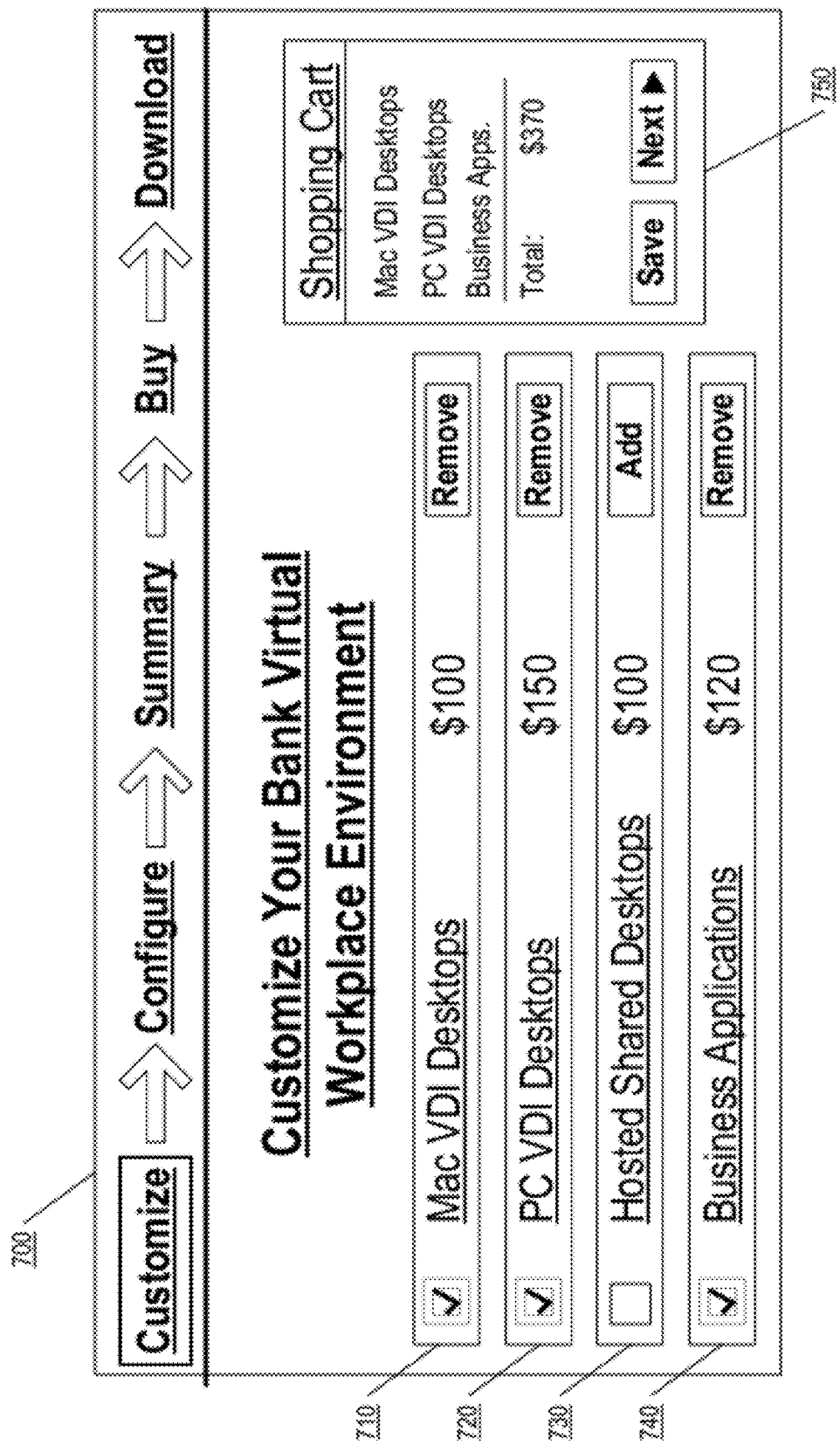

In FIG. 7, the user interface 700 provides a set of components allowing the user to select a set of features that may be included in the virtual workplace software 230. In this example, a user may add or remove a set of features 710-740 for VDI system software selected for a financial institution, including MAC VDI desktop support 710, PC VDI desktop support 720, hosted shared desktop support 730, and a set of business applications to be provided on the virtual machines 740. The prices of the respective software features 710-740 are displayed in the user interface, and a shopping cart 750 with a current total price is provided.

Figure 8:
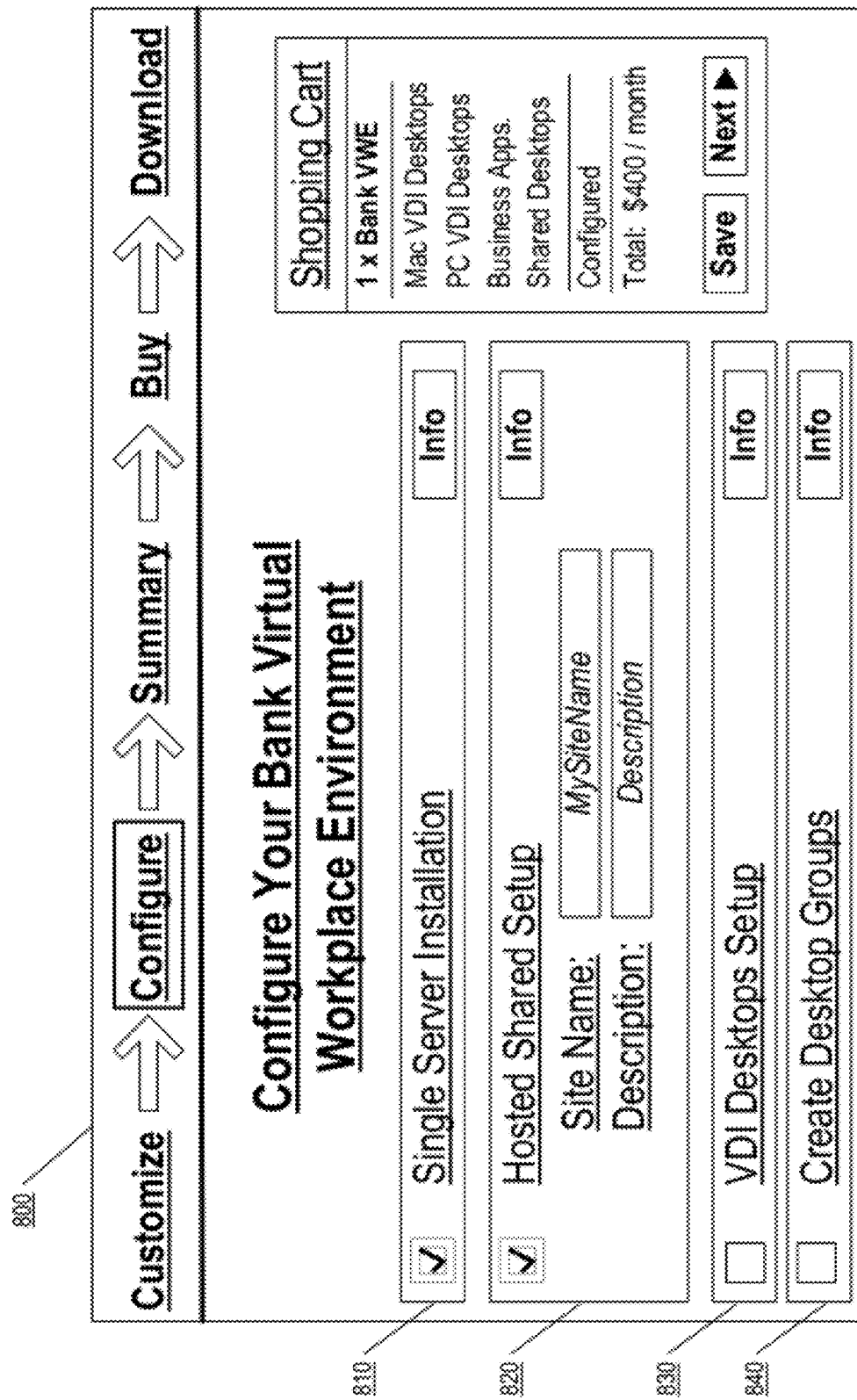

In FIG. 8, the user interface 800 provides a set of configuration components and options based on the features selected for the virtual workplace software 230. In this example, a set of features 810-840 have been selected for a VDI system, and the user may now review and configure one or more of the selected features 810-840 with the appropriate configuration options and settings. For example, a user may select a software configuration for a VDI system by identifying the selected software 230 as a single-server installation using a user interface component 810 (e.g., checkbox, numerical input, etc.). As another example, when configuring the hosted shared desktop support feature 820 for a VDI system, the user may be prompted to provide a site name and description to setup the hosted shared desktops.

Figure 9:
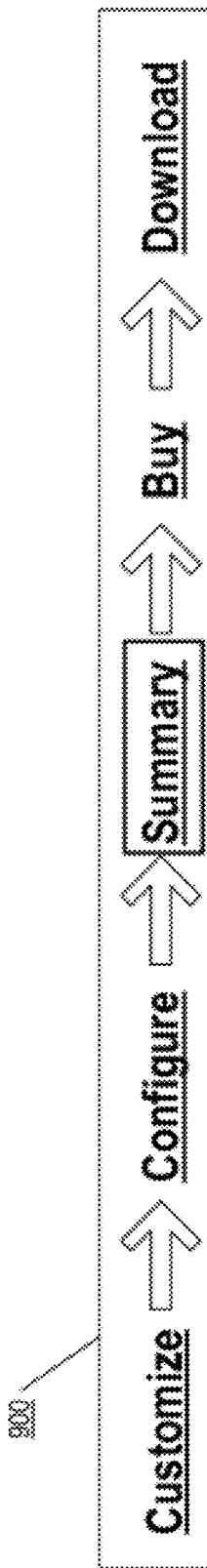

In FIG. 9, the user interface 900 provides a summary screen including a description of the selected virtual workplace software 230 (e.g., a VDI system for a bank or financial institution), the selected features for the virtual workplace software 230, and the configuration settings and respective prices for the software features. In this example, users may review and/or modify the selected virtual workplace software 230, features and configuration settings, and then either save the selection of the virtual workplace software 230 or proceed to purchase and/or download the corresponding software 230.

Figure 10:
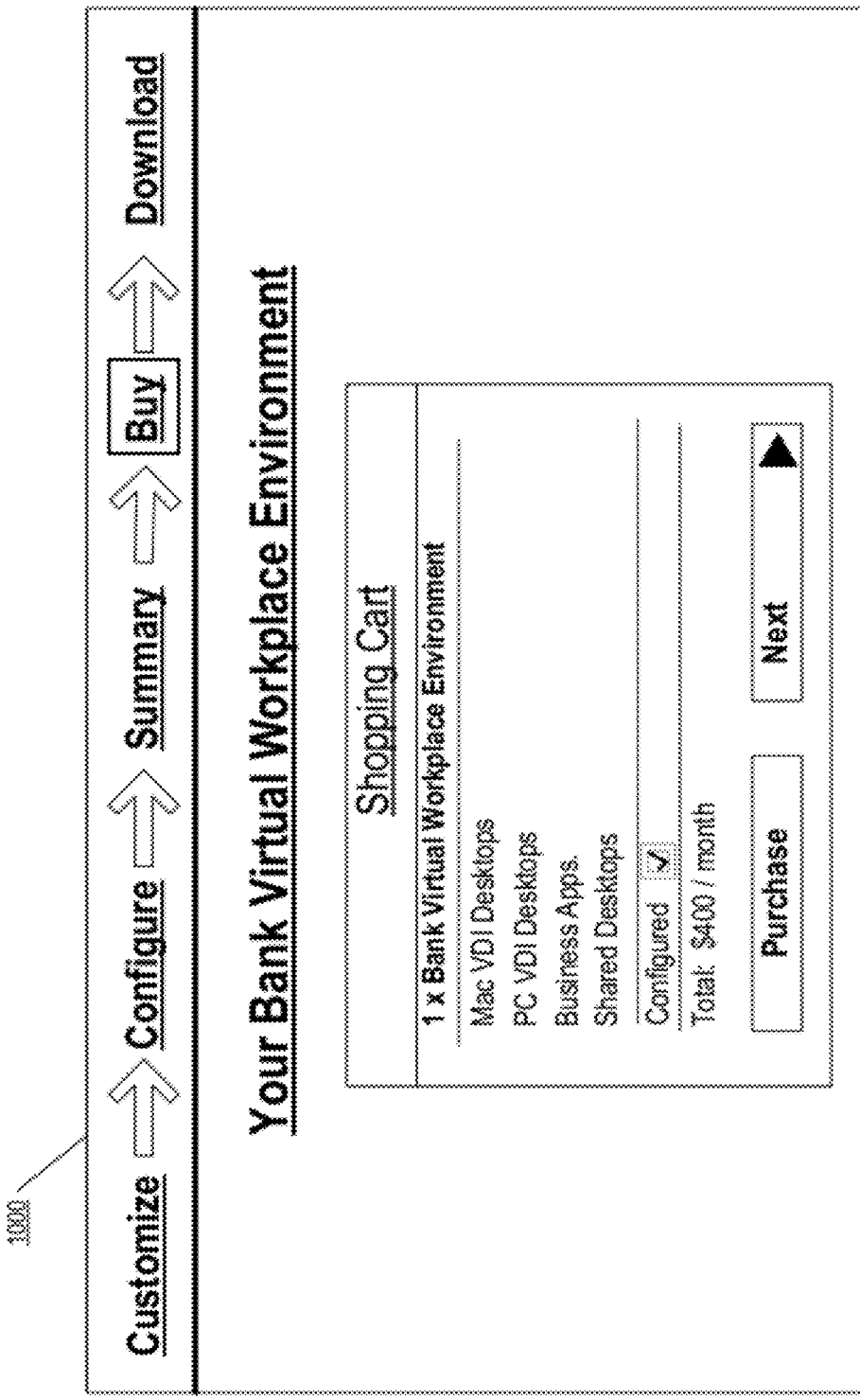

In FIG. 10, the user interface 1000 provides a purchasing screen allowing the user to buy the selected virtual workplace software 230, including the selected software features and having the selected configuration settings.

Figure 11:
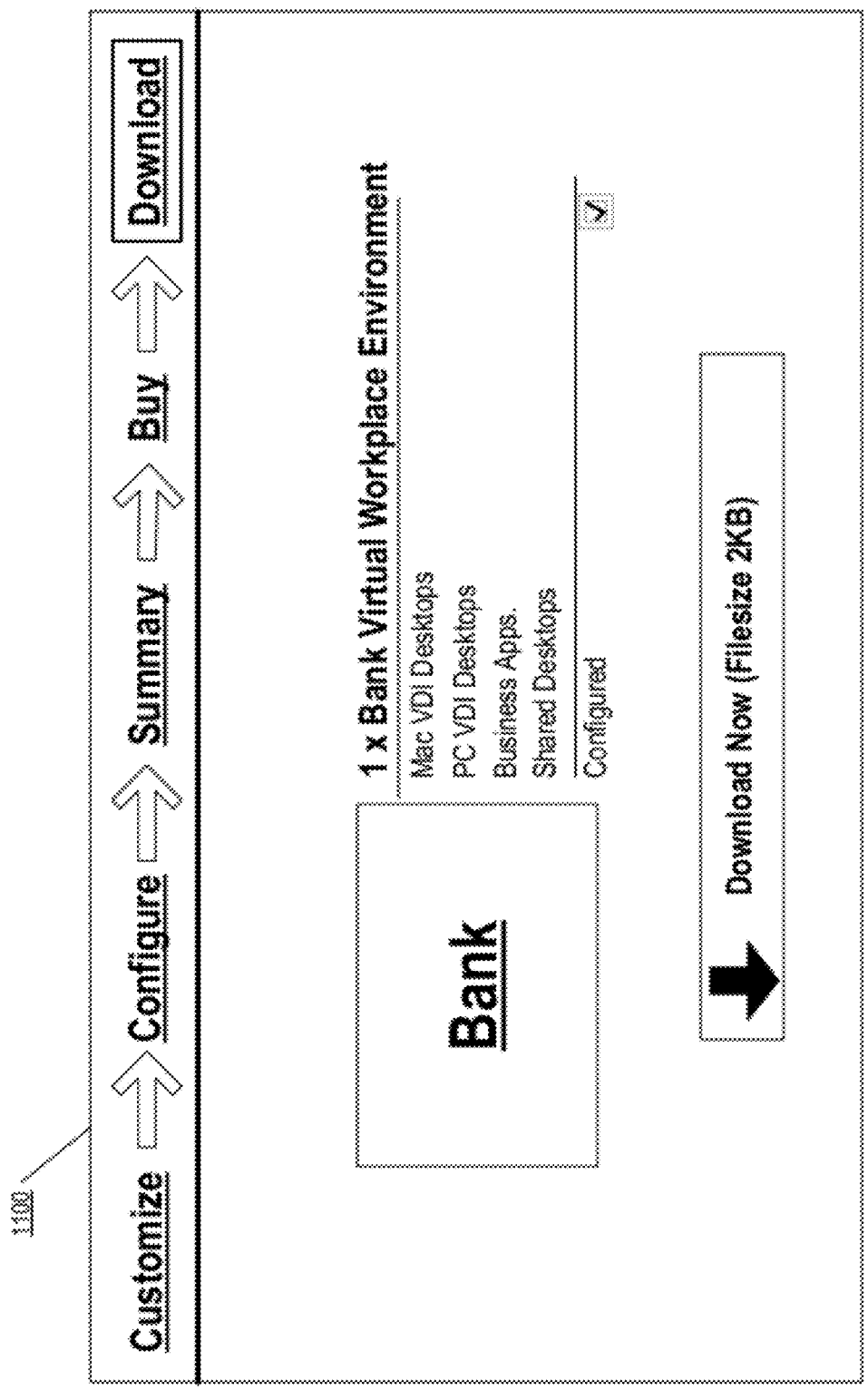

In FIG. 11, after the user has purchased the selected virtual workplace software 230, the user interface 1100 may provide a downloading screen allowing the user to immediately download the selected virtual workplace software 230, including the selected software features and having the selected configuration settings, onto an organization server 200. In certain examples, the software downloading user interface 1100 may prompt the user to run an installation program to install the virtual workplace software 230 directly onto the server 200. In other examples, the virtual workplace software 230 may be downloaded via the user interface 1100, to be installed later on one or more different computers from the computer receiving the software download.

Having described various techniques, embodiments, and examples of providing virtual workplace software 230 to a desktop virtualization server 200 in FIGS. 4-11, the following paragraphs describing FIGS. 12-19 provide additional examples of various methods and systems for using the virtual workplace software 230 installed on a desktop virtualization server 200, for example, to provide virtual desktops to authenticated remote users at client devices 300 and/or to provide virtual workplace management consoles to local or remote authenticated administrators.

Referring now to FIG. 12, a flow diagram is shown illustrating a method of providing virtual desktops and/or a virtual workplace management consoles within a desktop virtualization system. The embodiments described in reference to the flow diagram in FIG. 12, and the example user interface screens in FIGS. 13-19, may be implemented by software executed on one or more computer servers, such as the desktop virtualization server 200 and/or additional computing devices configured to perform desktop virtualization functionality.

In step 1201, a user at an organization server 200 or other computing device may provide input to a software provider 400 for determining a selection of virtual workplace software 230 for the organization server 200. Thus, as discussed above in steps 501-503, the user may interact with a user interface provided by the software provider 400 (e.g., via a web browser or other client application) to provide various information regarding the organization and the features and configuration settings for the virtual workplace software 230 to be installed on the organization server 200. An organization user may, for example, identify an organization type, relevant organizational priorities, factors, or limitations, an organization size, and may specify and/or configure various software features that may be included in virtual workplace software 230.

In step 1202, the selected virtual workplace software 230, including the selected software features and having the selected configuration settings, may be downloaded and/or installed on an organization server 200. Thus, after installation of the virtual workplace software 230, the server 200 may be referred to as a desktop virtualization server (or virtual workplace server) 200 and may be configured to perform one or more of the various desktop virtualization functions described herein (e.g., managing hypervisors 220, creating and managing virtual machines 240, and creating and managing connections between client access devices 300 and virtual machines 240, etc.).

In certain embodiments, rather than downloading the virtual workplace software 230, the virtual workplace software 230 may come pre-installed and packaged as a virtual appliance running on an open source operating system (e.g. Ubuntu or CentOS). In these examples, the user may simply load the virtual appliance and power it on, thereby potentially avoiding the tasks of installing the virtual workplace software 230 on the server 200 and integrating it into its environment.

In step 1203, the virtual workplace server 200 may receive a login request from a client access device 300. In this example, the login request may include the user's authentication credentials (e.g., username and password), so that the virtual workplace server 200 may authenticate the login request to determine the user's identity and confirm that the user is a valid user within the desktop virtualization system. For example, the virtual workplace server 200 may provide a secure and/or encrypted web page with a login window within a web-based application, or may use other secure authentication techniques, to request and receive the user's authentication credentials.

After receiving and validating the user's authentication credentials (e.g., username-password combination), the virtual workplace server 200 may then retrieve a set of user permissions and/or security credentials associated with user, for example, a user account or user profile, access control lists (ACL) for the user and/or user groups associated with the user, or other security/permissions information.

The login request received in step 1203 also may include an indication of one or more types of service requested by the user via the client access device 300. For example, the login request in step 1203 may be a request by a user to login to a virtual machine 240 and initiate a virtual desktop session at the client device 300. In other examples, the login request in step 1203 may be a request by an authorized administrator to perform management functions associated with the desktop virtualization system. The indication of what type of services the user is requesting may be determined implicitly, for example, by receiving a login request via a web page or other client user interface dedicated to a specific function (e.g., initiating a virtual desktop session on a specific virtual machine). In other examples, a user may login via a multi-purpose login screen, from which users may initiate different types of virtual desktop sessions on various different virtual machines, or may perform one or more management functions for the desktop virtualization system.

In step 1204, the virtual workplace server 200 determines whether the logged in user is an administrator authorized to perform management functions, or a non-administrator user that is only authorized to initiate virtual desktop sessions at one or more virtual machines 240. In this example, if the user is an authorized administrator, the administrator may be directed to the user interface of a management console in step 1260 that is provided to allow the administrator to perform the various management functions for the desktop virtualization system. If the user is not an administrator in this example, the user may be prompted or directed to initiate a virtual desktop session in step 1250, and might not be permitted to access the management console user interface.

In other embodiments, the user interface and/or functionality made available to the user may be determined using other techniques as well. For example, during the authentication process the virtual workplace server 200 may identify a set of functions and/or interactions that the user is authorized to perform on the desktop virtualization system. For example, a first low-level user may be authorized to initiate a virtual desktop session at certain virtual machines 240, however, the user might not be authorized for sessions at other virtual machines 240 or to perform any management functions. Other users may have authorization for different sets of functions and/or interactions relating to initiating virtual desktop sessions at virtual machines 240 and to perform various management functions on the system. Thus, after identifying the user and determining (e.g., retrieving from the server memory 210) the set of functions/interactions that the user is authorized to perform, the virtual workplace server 200 may customize the user interface options based on the user's permissions. For instance, if a user is only authorized to initiate a virtual desktop session at a single virtual machine 240, then upon logging in to the server 200 the user may be immediately prompted or redirected to initiate a virtual desktop session at that virtual machine 240, without having the option to connect to other virtual machines 240 or access a management console. As another example, if the server 200 determines that an administrator is authorized to perform certain management functions and not others, then the server 200 may provide the authorized administrator with a management console user interface including the set of functions that the administrator is authorized to perform, and not including any functions that the administrator is not authorized to perform.

Referring now to FIGS. 13-19, a series of example user interface screens are shown for a web-based user interface provided by virtual workplace server 200 to allow users to initiate a virtual desktop sessions and/or perform management functions within the desktop virtualization system.

Figure 13:
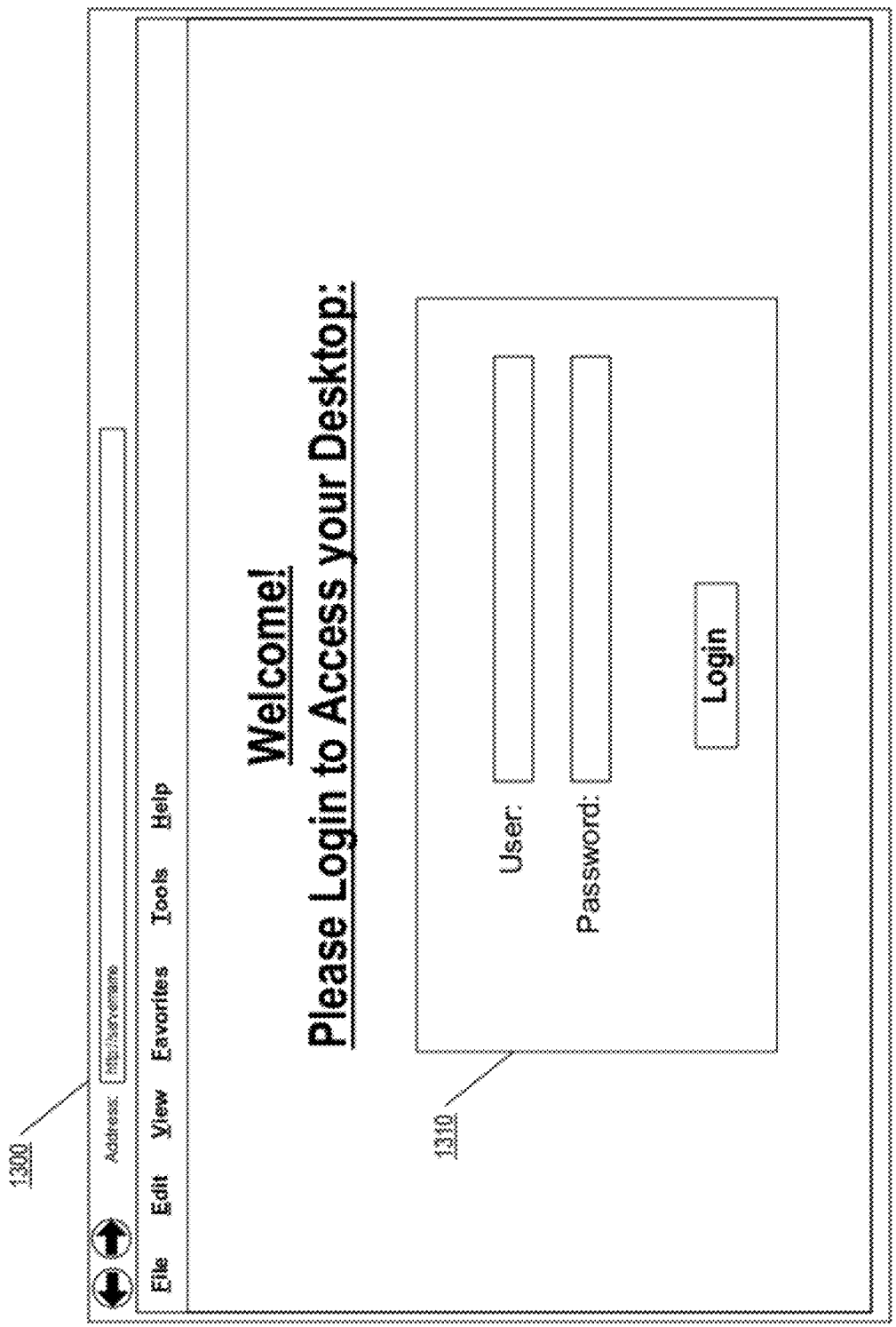

In FIG. 13, an example web page user interface screen 1300 is shown including a login window 1310. As discussed above, the user interface screen 1300 may be generated by the virtual workplace server 200 to be accessed by a user on a client access device 300 or other computing device. In this example, upon entering a username and password, the user may be provided a virtual desktop if they are an authorized end user, or may be entered into the management console if they are an authorized administrator. Additionally, if an authorized end user has access to many types of virtual desktops (e.g., different virtual machines 240 or virtual machine templates), then user interface screen 1300 may allow the user to select a virtual machine 240 or template on which to initiate a virtual desktop session.

In this example, a connection broker software component within the virtual workplace software 230 may accept the user credentials and provide the validation and connectivity service. If the user is an administrator, the connection broker may authenticate the user and, if valid, may provide access to the management console. If the user's credentials are invalid, the connection broker may notify the user that they do not have the privilege to access the management console. If the user is a non-administrator end user, the connection broker may poll the state engine 320 to determine if the user is authorized for access to a virtual desktop (e.g., virtual machine 240). If not, the connection broker may return an error notification to the user. Otherwise, if the user is authorized to access one or more virtual desktops, and if at least one of such virtual machines 240 is available, the connection broker may provide an Internet Protocol (IP) address of an available virtual machine 240 to the client application. If the user is authorized but no virtual machines 240 are currently available, the connection broker may instruct the policy engine 330 to create a new virtual machine 240 appropriate to the user's needs and authentication credentials. If the user already has an existing virtual desktop session and has specified (e.g., via the login screen user interface) that they want to connect to the existing session, the connection broker may enable that connection.

After an authorized end user logs in to initiate a virtual desktop session, the desktop agent 350 running on the virtual machine 240 may notify the virtual workplace software 230 that a user has logged in and may provide the credentials of the user. The virtual workplace software 230 may use this information to update the records of active user sessions and to confirm that the logged-in user is the same as the user authenticated by the connection broker. Similarly, after an end user logs out of a virtual desktop session, the desktop agent 350 running on the virtual machine 240 may notify the virtual workplace software 230 that the user has logged out of the virtual machine 240. The virtual workplace software 230 may use this information, along with the template policy of the virtual machine 240, to determine what to do with the virtual machine 240. For instance, based on the virtual machine's 240 template policy, the virtual workplace software 230 may determine that it should immediately destroy the virtual machine 240 and create a fresh one, or it may schedule the virtual machine 240 for a later destruction-creation, or it might not destroy the virtual machine 240 at all unless it is explicitly requested by an administrator. Other virtual desktop management policies are also possible. Additionally, the virtual workplace software 230 may use the logout information to update the records of active user sessions. As noted above, the desktop agents 350 also may send periodic messages to the virtual workplace software 230 indicating that it the virtual machine 240 is alive. These periodic messages may allow the virtual workplace software 230 to ensure that user sessions are active and functional.

In order for a user to interact with a virtual machine 240 from a client access device 300 in a virtual desktop session, a remoting protocol may be used. One example is the Remote Desktop Protocol (RDP) provided by Microsoft Corporation of Redmond, Wash. ("Microsoft"), however, the desktop virtualization systems and methods described herein need not be limited to one or more remoting protocol(s), but may be performed using multiple different remoting protocols applicable to server and client agents in which the server agent executes on the virtual machine 240 and the client agent runs on the client access device 300. Using a remoting protocol, keyboard and mouse inputs from the client access device 300 may be communicated to the remoting protocol server agent on the desktop agent 350, which in turn communicates the inputs to the operating system of the virtual machine 240. The virtual machine 240 operating system may process the user input and communicate changes to the virtual machine, including all user interface changes, back to the client agent running on the client access device 300.

Figure 14:
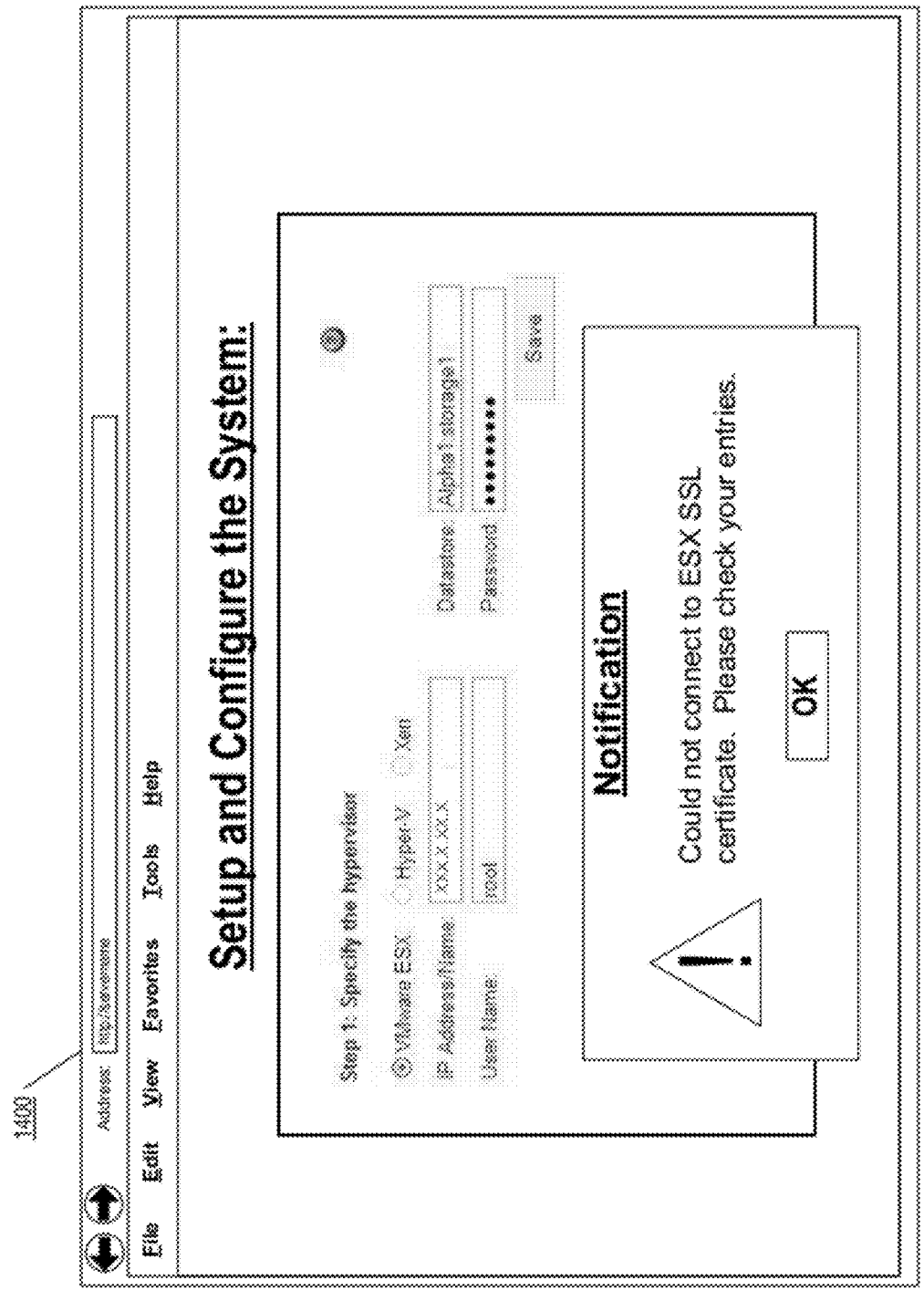

In FIG. 14, an example web page user interface screen 1400 is shown for configuring and initializing the virtual workplace software 230. These functions may be performed locally on the desktop virtualization server 200, or remotely from another computer (e.g., client access device 300). In configuring the virtual workplace software 230, the user may identify the hypervisor 220 to allow the actuation engine 310 to manage the hypervisor 220 by sending commands and receiving responses and status information from the hypervisor 220. In this example, the user may enter a unique identifier of the hypervisor, for example, its IP address or DNS name, along with its storage system, and valid user credentials for accessing the hypervisor 220. In other examples, additional configuration information may be required depending on the hypervisor 220 and the level of resource management the virtual workplace software 230 is designed to provide.

Additionally, in certain embodiments, user management may involve integrating with an LDAP or Active Directory server that may contain information about the users in the organization and their computer user names. In such examples, this database of user information may be used to assign users to virtual machine templates without having to re-enter the user names. As when identifying the hypervisor 220, when integrating with an LDAP or Active Directory server, a unique identifier (e.g., IP address or DNS name) and credentials for a valid account on the server 200 may be needed.

Figure 15:
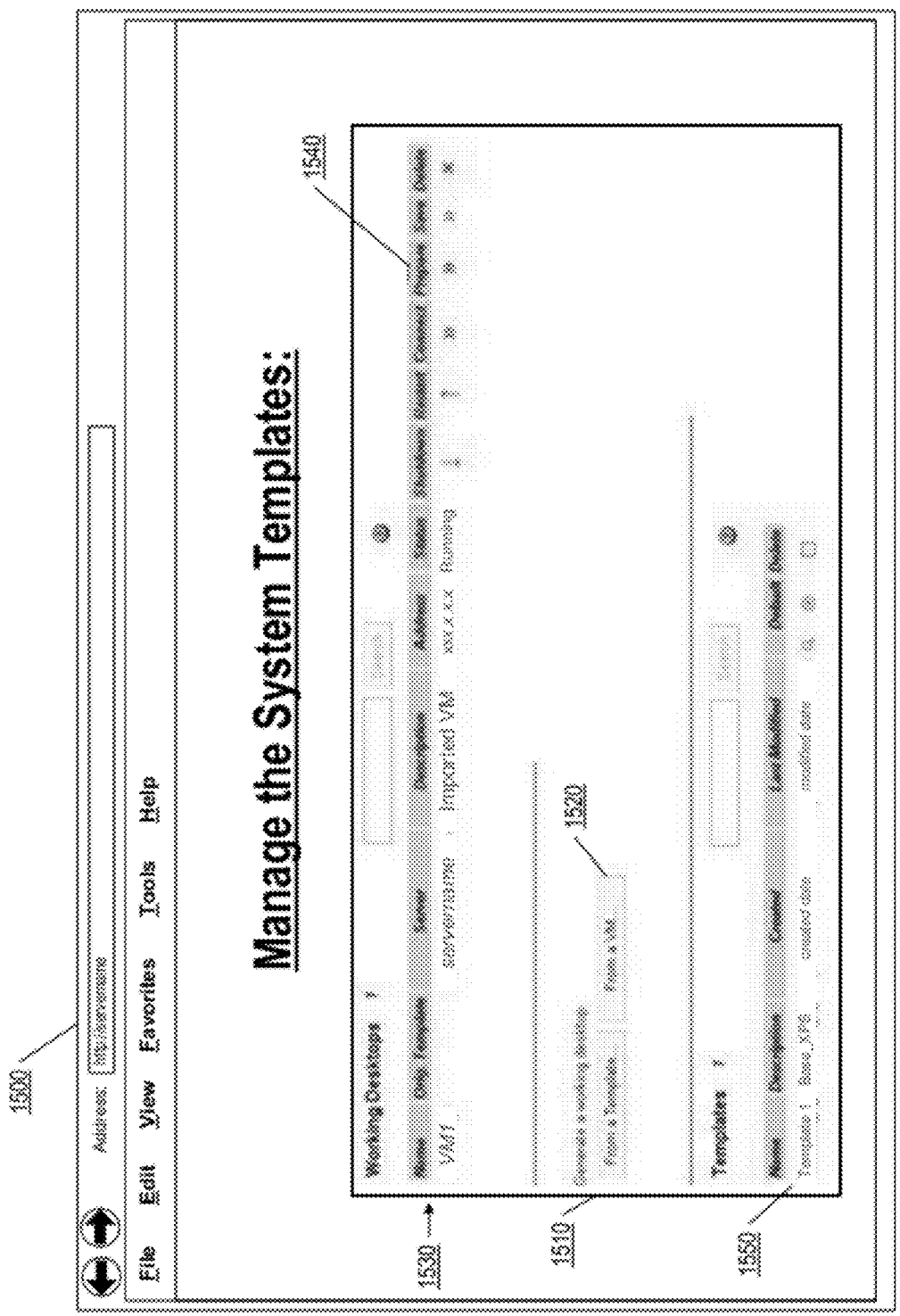
Figure 16:
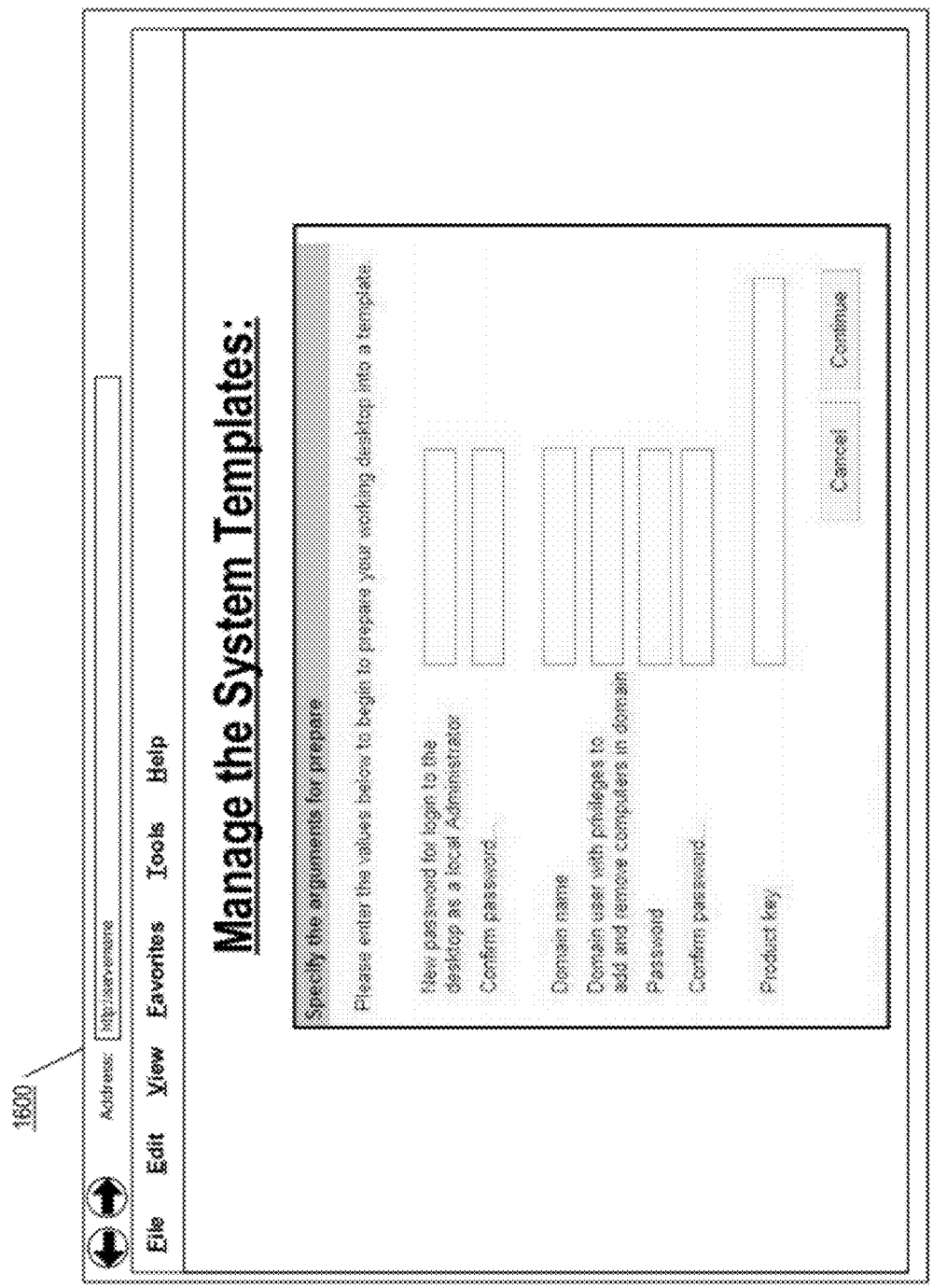
Figure 17:
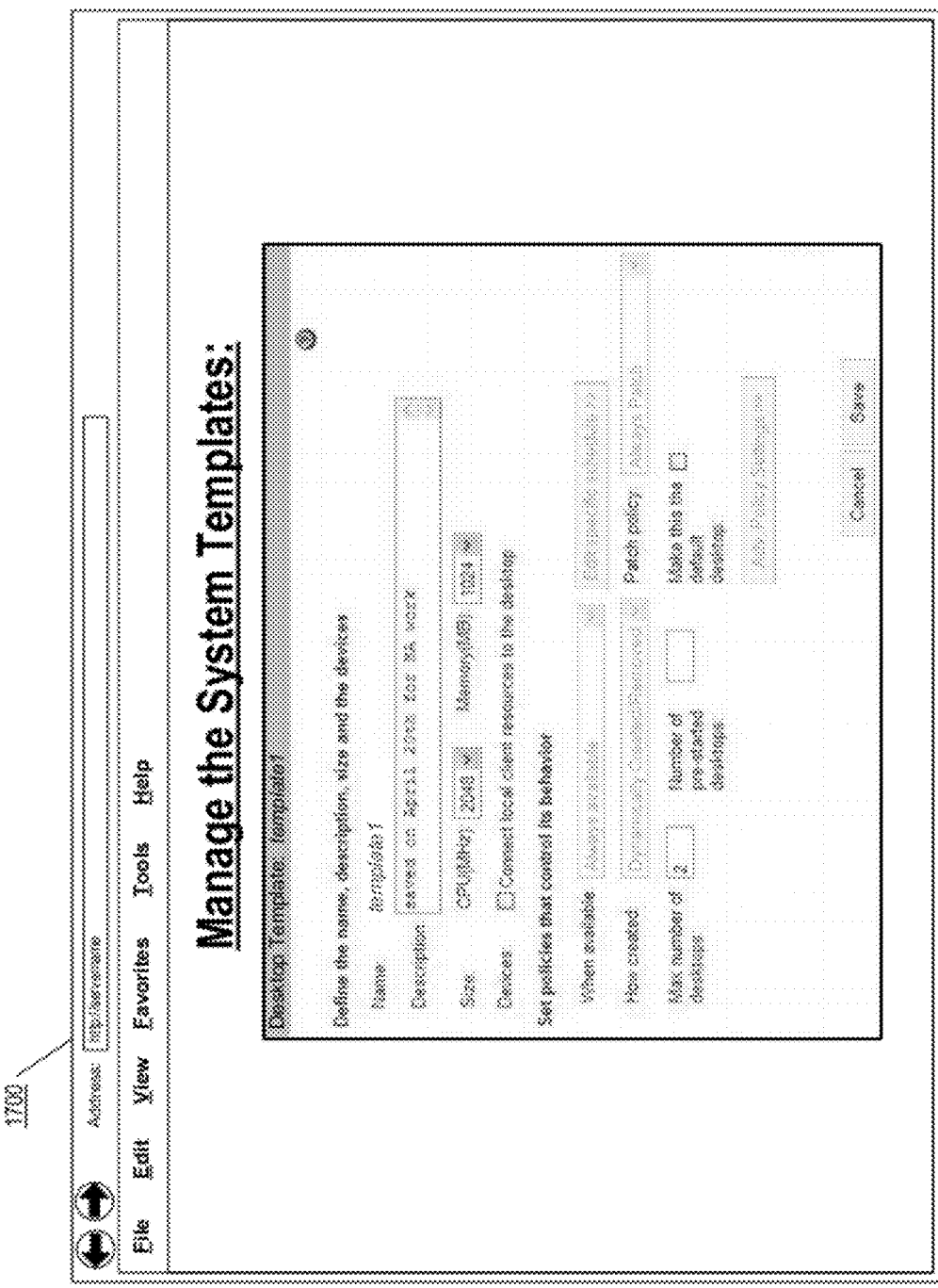

In FIGS. 15-17, a set of example web page user interface screens 1500-1700 are shown creating and managing the lifecycle of virtual machine templates. As discussed above, a virtual machine template may include an image of a specific virtual machine 240, including its operating system (e.g., Windows XP, MAC OS), its applications, and configuration and user settings. Additionally, a virtual machine template may include its desktop agent 350 that communicates with the virtual workplace software 230 and the remoting protocol server agent at the client access devices 300. A virtual machine template also may include certain metadata and policy information, for example:

- A desired size of virtual machines 240 (e.g., in CPU hertz) and a desired size of the RAM for virtual machines 240 based on the template
- A minimum number and/or a maximum number of virtual machines 240 that should be created and maintained to be ready and available
- Creation and/or deletion policies, for instance, whether a virtual machine 240 should be dynamically generated and destroyed as users log in and log out, or whether the virtual machines 240 corresponding to the template should be preserved across logins and logouts.
- Policies specifying whether peripherals of the client access devices 300 may be seen and manipulated by the virtual machine 240. For instance, if activated, whether a user can map the disk drive on their client access device 300 so that it may be read and written by the virtual machine 240.
- Information required to use the sysprep utility (sysprep) provided by Microsoft to insert the virtual machines 240 created from the template into a specified Windows domain.

In certain examples, multiple virtual machine templates with different metadata and policy information may utilize the same base desktop image.

Virtual machine templates may be created from an existing virtual machine 240 running a desktop operating system (e.g. Windows XP, Ubuntu), or from another template created by the virtual workplace software 230. When creating a virtual machine template from an existing virtual machine 240, the existing virtual machine 240 may be imported into the hypervisor 220, for example, using tools provided by the hypervisor vendor.

In the example shown in FIG. 15, when one of the buttons 1510 or 1520 is selected, the user interface may prompt the user to specify the name of a virtual machine template (1510) or a specific virtual machine 240 (1520). Then, the virtual workplace software 230 may verify that the specified entity (i.e., template or virtual machine) exists, and then use the hypervisor API to power the entity on and provide a set of controls 1530 to take the entity through the template creation lifecycle.

In this example, the virtual machine template creation and modification process may include the following steps:

First, the virtual machine or existing template may be started and connected to by sending the appropriate commands to the hypervisor 220 via the hypervisor API, and then using a connection protocol to connect to the virtual machine or existing template.

Second, an administrator may modify the virtual machine or existing template as though it was a physical computer. For example, the administrator may add, modify, or delete software from the virtual machine or existing template. The administrator may also add a desktop agent 350 that may communicate with the virtual workplace software 230, install and enable a remote protocol agent that may communicate with the client access devices 300, and perform other configuration operations needed to ensure proper functioning and management of the desktop.

Third, the administrator may provide the information needed by the template to generate virtual machines 240 in a specific domain (e.g., a Windows domain). In this example, this may be performed by selecting the "Prepare" button 1540. After selecting button 1540, an additional user interface screen may be provided by the virtual workplace software 230 to input this information, for instance, the example user interface 1600 shown in FIG. 16. As shown in this example, the user interface 1600 may require the domain name, an administrator password to the domain controller, a product key and other information required to appropriately sysprep the virtual machine 240 into a domain or workgroup. In certain embodiments, this step may be particular to Windows operating systems and may be different for virtual machines 240 using other operating systems (e.g., Linux).

Fourth, the administrator may use the state engine 320 to save the virtual machine template, for example, in server storage 210. The state engine 320 may also store additional metadata describing the size of the virtual machines 240 that may be generated from the template, the set of client access devices 300 that the virtual machines 240 can access, and how many virtual machines 240 to create. The example user interface 1700, shown in FIG. 17, illustrates a user interface screen provided by the virtual workplace software 230 to allow the user to input this and other information regarding the new virtual machine template.

After a new virtual machine template is created and saved (or after an existing virtual machine template is modified and saved), the template may appear in the list of virtual machine templates 1550 shown in FIG. 15. In this example, the template list 1550 may provide template information and any necessary controls for an administrator to access, modify, copy, and delete the template throughout its lifetime.

Figure 18:
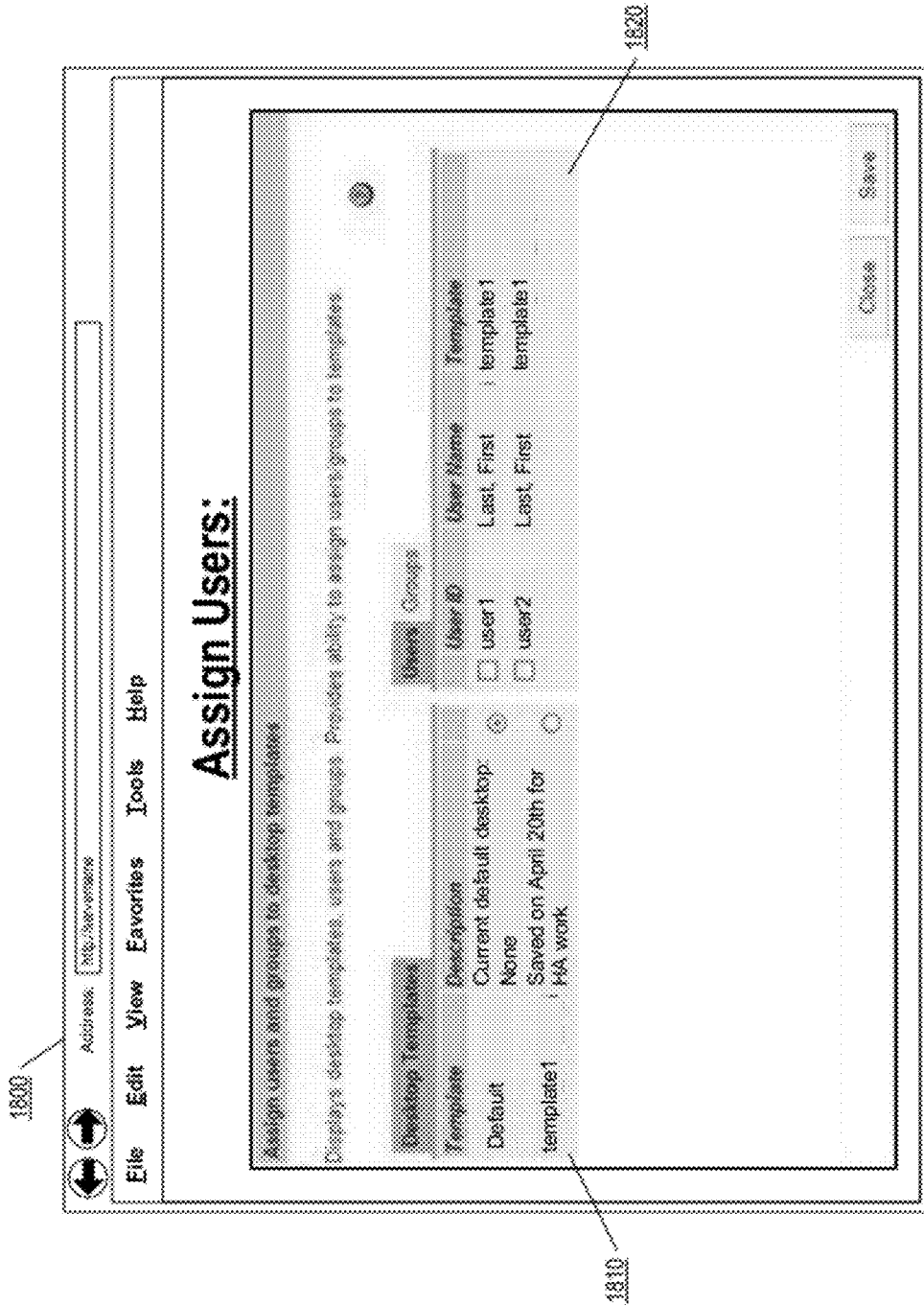

Referring now to FIG. 18, an example web page user interface screen 1800 is shown for associating users and groups of users with various virtual machine templates. In this example, the left pane 1810 includes a list of the virtual machine templates currently stored on the server 200, and the right pane 1820 includes two tab-controlled lists of users and groups. The administrator may select a virtual machine template from the left pane 1810, and then select one or more users and/or groups from the right pane 1820 to associate those users/groups with the selected template. In certain embodiments, the lists users and groups 1820 may be obtained from LDAP or Active Directory, or may be stored and maintained manually in a database (e.g., storage system 210) by the virtual workplace software 230. Once the associations between users/groups and templates have been selected and stored, these associations may be retrieved during the authorization process to determine which users and groups have access to which virtual machines 240. For example, the associations of users and groups to templates may be kept in persistent server storage 210 and used by the connection broker of the virtual workplace software 230 to determine the type of virtual machine 240 to provide to an end user. As discussed above, users and groups also may have the ability to access and initiate virtual desktop sessions with more than one type of virtual machine 240. In this case, users may be permitted to choose one of their associated virtual machine templates during or after login time in order to initiate a virtual desktop session with a virtual machine from that template.

Figure 19:
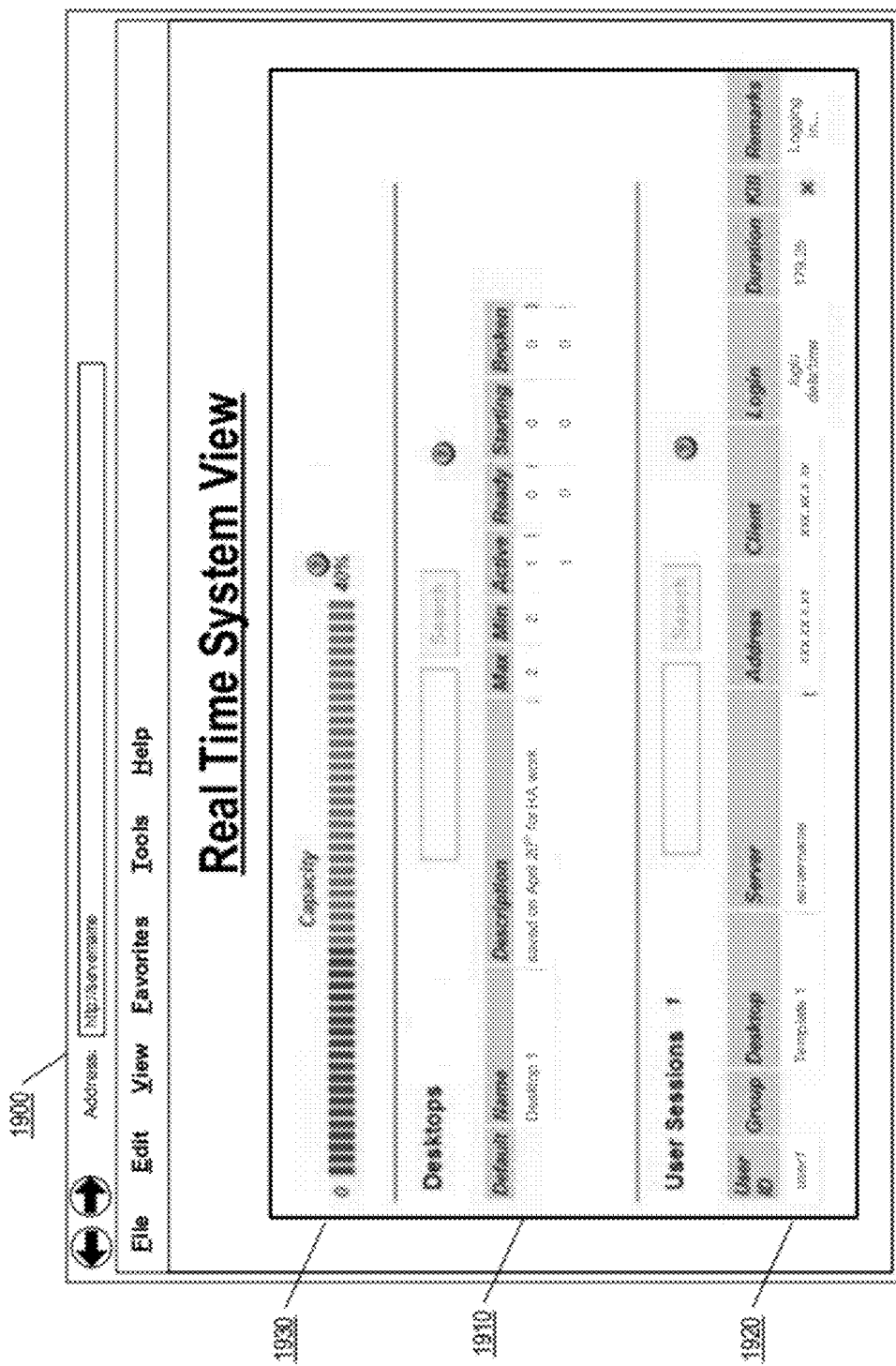

Referring now to FIG. 19, an example web page user interface screen 1900 is shown of a real time system view and operation screen for the desktop virtualization server 200 and/or the desktop virtualization system as a whole (e.g., for multi-server installations). In this example, the real time system view screen includes three sections, a desktops list 1910, a user sessions list 1920, and a capacity bar 1930.

The desktops list 1910 provides a list of information for each virtual machine template currently stored at the server 200. For each template, the desktops list 1910 in this example includes the maximum and minimum number of virtual machines 240 that are to be created from that template, and the number of virtual machines 240 based on that template that are "active" (i.e., in use), "ready" (i.e., waiting to be logged into by users), and "starting" (i.e., in the process of being dynamically created).

The user sessions list 1920 in this example provides a list of information about each currently active user session supported by a virtual machine 240 on the server 200. For each active session, the sessions list 1920 includes the user, the type of virtual machine (i.e., the template) being used for the session, the IP address of the virtual machine 240 being used, the IP address of the client access device 300, and information corresponding to when and for how long the user has been logged in. In different examples, additional relevant information may be provided in the user sessions list 1920 to further allow users to manage, monitor, and record information about the active user sessions on the server 200. In certain embodiments, user interface 1900 may provide a control enabling the administrator to select and terminate a user session from the list 1920.

Capacity bar 1930 may be used to provide a high-level view of the current capacity of the server 200. In this example, the capacity bar 1930 provides a visual representation of the server's capacity with respect to a combination of the server's 200 active and ready virtual machines 240. In other examples, the capacity bar section 1930 may include multiple capacity bars to separately display the capacities for the server's 200 active and ready virtual machines 240. Additional capacity bars and/or other data may be included as well, for example, an estimated server capacity if the maximum number of virtual machines 240 were to be created for all existing templates on the server 200.

Various aspects described herein may be embodied as a method, an apparatus, or as one or more computer-readable media storing computer-executable instructions. Accordingly, those aspects may take the form of an entirely hardware embodiment, an entirely software embodiment, or an embodiment combining software and hardware aspects. Any and/or all of the method steps described herein may be embodied in computer-executable instructions. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure. Modifications may be made by those skilled in the art, particularly in light of the foregoing teachings. For example, each of the elements of the aforementioned embodiments may be utilized alone or in combination or sub-combination with elements of the other embodiments. It will also be appreciated and understood that modifications may be made without departing from the true spirit and scope of the present invention.

The invention claimed is:

1. A method comprising:
receiving, by a first computing device, a first input corresponding to one or more characteristics of an organization;
determining, based on the first input, an organization type for the organization, wherein the organization type is selected from a plurality of different organization types;
receiving, at the first computing device, a second input corresponding to an organization size;
receiving, at the first computing device, a third input corresponding to a selection of at least one virtual desktop type from a set of virtual desktop types comprising (a) hosted shared desktops, and (b) hosted virtual desktops;
receiving a selection of one or more operating system platforms corresponding to the at least one selected virtual desktop type;
determining, based on the organization type and the second input corresponding to the organization size, virtual workplace server software for the organization, the virtual workplace server software comprising one or more software components selected from a plurality of server-side software components configured to provide desktop virtualization services to members of the organization, wherein determining the virtual workplace server software for the organization comprises:
selecting a virtual workplace software component that supports the at least one selected virtual desktop type; and
selecting the one or more server-side software components of the virtual workplace server software based on the selected operating system platforms; and
outputting, by the first computing device, the selected virtual workplace server software.

2. The method of claim 1, further comprising:
providing, by the first computing device, a software download of the one or more software components corresponding to the selected virtual workplace server software.

3. A method comprising:
receiving, by a first computing device, a first input corresponding to one or more characteristics of an organization, wherein receiving the first input comprises:
providing a user interface displaying a plurality of organization types; and
receiving a selection via the user interface of one of the plurality of organization types;

receiving, at the first computing device, a second input corresponding to an organization size;

determining, based on the selected organization type and the second input corresponding to the organization size, virtual workplace server software for the organization, the virtual workplace server software comprising one or more software components selected from a plurality of server-side software components configured to provide desktop virtualization services to members of the organization, wherein determining the virtual workplace server software for the organization comprises selecting the one or more server-side software components of the virtual workplace server software based on the selected organization type, wherein selecting the one or more server-side software components comprises:

determining one or more organizational priorities from a set comprising cost, security, scalability, reliability, and performance, based on the selected organization type; and selecting the one or more server-side software components based on the determined organizational priorities; and outputting, by the first computing device, the selected virtual workplace server software.

4. The method of claim 3, further comprising:

receiving an input corresponding to a selection of at least one virtual desktop type from a set of virtual desktop types comprising (a) hosted shared desktops, and (b) hosted virtual desktops, wherein determining the virtual workplace server software for the organization comprises selecting a virtual workplace software component that supports the at least one selected virtual desktop type.

5. The method of claim 1, further comprising:

receiving an input corresponding to a selection of at least one software application, wherein determining the virtual workplace server software for the organization comprises selecting a virtual workplace software component that supports the at least one selected software application.

6. The method of claim 1, further comprising:

receiving an input corresponding to a selected number of server installations, wherein determining the virtual workplace server software for the organization comprises selecting a virtual workplace software component that is configured to operate within a virtual workplace environment having the selected number of server installations.

7. The method of claim 1, wherein receiving the first input comprises:

providing a user interface displaying a plurality of organization types; and receiving a selection via the user interface of one of the plurality of organization types, wherein determining the virtual workplace server software for the organization comprises:

selecting the one or more server-side software components of the virtual workplace server software based on the selected organization type.

8. The method of claim 7, wherein the plurality of organization types displayed in the user interface includes one or more of: a healthcare institution organization type, an educational institution organization type, a financial institution organization type; and a governmental institution organization type.

9. The method of claim 1, wherein receiving the first input comprises:

providing a user interface displaying a plurality of organizational priorities with respect to a virtual workplace environment, the plurality of organizational priorities comprising one or more of cost, security, scalability, reliability, and performance; and receiving a selection via the user interface of one or more of the organizational priorities, wherein determining the virtual workplace server software for the organization comprises:

selecting the one or more server-side software components of the virtual workplace server software based on the selected organizational priorities.

10. A computing device comprising:

a processor controlling at least some operations of the computing device; and memory storing computer executable instructions that, when executed by the processor, cause the computing device to:

receive a first input corresponding to one or more characteristics of an organization;

determine, based on the first input, an organization type for the organization, wherein the organization type is selected from a plurality of different organization types stored in the memory of the computing device;

receive a second input corresponding to an organization size;

receive a third input corresponding to a selection of at least one virtual desktop type from a set of virtual desktop types comprising (a) hosted shared desktops, and (b) hosted virtual desktops;

receive a selection of one or more operating system platforms corresponding to the at least one selected virtual desktop type;

determine, based on the organization type and the second input corresponding to the organization size, virtual workplace server software for the organization, the virtual workplace server software comprising one or more software components selected from a plurality of server-side software components configured to provide desktop virtualization services to members of the organization, wherein determining the virtual workplace server software for the organization comprises:

selecting a virtual workplace software component that supports the at least one selected virtual desktop type; and selecting the one or more server-side software components of the virtual workplace server software based on the selected operating system platforms; and output the selected virtual workplace server software.

11. The computing device of claim 10, the memory storing further computer executable instructions that, when executed by the processor, cause the device to:

provide a software download of the one or more software components corresponding to the selected virtual workplace server software.

12. A computing device comprising:

a processor controlling at least some operations of the computing device; and a memory storing computer executable instructions that, when executed by the processor, cause the device to:

receive a first input corresponding to one or more characteristics of an organization, wherein receiving the first input comprises:

providing a user interface displaying a plurality of organization types; and
receiving a selection via the user interface of one of the plurality of organization types;
determine, based on the first input, an organization type for the organization, wherein the organization type is selected from a plurality of different organization types stored in the memory of the computing device;
receive a second input corresponding to an organization size;
determine, based on the organization type and the second input corresponding to the organization size, virtual workplace server software for the organization, the virtual workplace server software comprising one or more software components selected from a plurality of server-side software components configured to provide desktop virtualization services to members of the organization,
wherein determining the virtual workplace server software for the organization comprises selecting the one or more server-side software components of the virtual workplace server software based on the selected organization type, wherein selecting the one or more server-side software components comprises:
determining one or more organizational priorities from a set comprising cost, security, scalability, reliability, and performance, based on the selected organization type; and
selecting the one or more server-side software components based on the determined organizational priorities; and
output the selected virtual workplace server software.

13. The computing device of claim 12, the memory storing further computer executable instructions that, when executed by the processor, cause the device to:
receive an input corresponding to a selection of at least one virtual desktop type from a set of virtual desktop types comprising (a) hosted shared desktops, and (b) hosted virtual desktops,
wherein determining the virtual workplace server software for the organization comprises selecting a virtual workplace software component that supports the at least one selected virtual desktop type.

14. The computing device of claim 10, the memory storing further computer executable instructions that, when executed by the processor, cause the device to:
receive an input corresponding to a selection of at least one software application,
wherein determining the virtual workplace server software for the organization comprises selecting a virtual workplace software component that supports the at least one selected software application.

15. The computing device of claim 10, the memory storing further computer executable instructions that, when executed by the processor, cause the device to:
receive an input corresponding to a selected number of server installations,
wherein determining the virtual workplace server software for the organization comprises selecting a virtual workplace software component that is configured to operate within a virtual workplace environment having the selected number of server installations.

16. The computing device of claim 10, the memory storing further computer executable instructions that, when executed by the processor, cause the device to:
provide a user interface displaying a plurality of organization types; and
receive a selection via the user interface of one of the plurality of organization types,
wherein determining the virtual workplace server software for the organization comprises:
selecting the one or more server-side software components of the virtual workplace server software based on the selected organization type.

17. The method of claim 3, further comprising:
receiving an input corresponding to a selection of at least one software application,
wherein determining the virtual workplace server software for the organization comprises selecting a virtual workplace software component that supports the at least one selected software application.

18. The method of claim 3, further comprising:
receiving an input corresponding to a selected number of server installations,
wherein determining the virtual workplace server software for the organization comprises selecting a virtual workplace software component that is configured to operate within a virtual workplace environment having the selected number of server installations.

19. The computing device of claim 12, the memory storing further computer executable instructions that, when executed by the processor, cause the device to:
receive an input corresponding to a selection of at least one software application,
wherein determining the virtual workplace server software for the organization comprises selecting a virtual workplace software component that supports the at least one selected software application.

20. The computing device of claim 12, the memory storing further computer executable instructions that, when executed by the processor, cause the device to:
receive an input corresponding to a selected number of server installations,
wherein determining the virtual workplace server software for the organization comprises selecting a virtual workplace software component that is configured to operate within a virtual workplace environment having the selected number of server installations.

* * * * *